(12) United States Patent
Briscoe

(10) Patent No.: US 7,212,634 B2
(45) Date of Patent: May 1, 2007

(54) DATA DISTRIBUTION

(75) Inventor: Robert John Briscoe, Woodbridge (GB)

(73) Assignee: British Telecommunications plc, London (GB)

( * ) Notice: Subject to any disclaimer, the term of this patent is extended or adjusted under 35 U.S.C. 154(b) by 922 days.

(21) Appl. No.: 10/019,012

(22) PCT Filed: Jul. 20, 2001

(86) PCT No.: PCT/GB00/02813

§ 371 (c)(1),
(2), (4) Date: Dec. 26, 2001

(87) PCT Pub. No.: WO01/08348

PCT Pub. Date: Feb. 1, 2001

(65) Prior Publication Data

US 2003/0044017 A1 Mar. 6, 2003

(30) Foreign Application Priority Data

Jul. 23, 1999 (EP) .................................. 99305870

(51) Int. Cl.
H04L 9/00 (2006.01)
(52) U.S. Cl. .................. 380/203; 380/42; 380/268; 380/277; 705/51; 705/57; 709/203; 713/163; 713/180; 713/181; 726/26; 726/30; 726/32
(58) Field of Classification Search ...................... None
See application file for complete search history.

(56) References Cited

U.S. PATENT DOCUMENTS

| | | | | |
|---|---|---|---|---|
| 5,309,516 A | * | 5/1994 | Takaragi et al. | 380/45 |
| 6,078,663 A | * | 6/2000 | Yamamoto | 380/260 |
| 6,125,186 A | * | 9/2000 | Saito et al. | 380/287 |
| 6,182,220 B1 | * | 1/2001 | Chen et al. | 713/182 |
| 6,477,649 B2 | * | 11/2002 | Kambayashi et al. | 726/27 |
| 6,772,340 B1 | * | 8/2004 | Peinado et al. | 713/168 |
| 6,801,999 B1 | * | 10/2004 | Venkatesan et al. | 713/167 |

(Continued)

FOREIGN PATENT DOCUMENTS

DE 19511298 A1 10/1996

(Continued)

OTHER PUBLICATIONS

Griwodz, C., et al, 'Protecting VoD the Easier Way', ACM, 1998, pp. 21-28, http://delivery.acm.org/10.1145/300000/290751/p21-griwodz.pdf?key1=290751&key2=3917124611&coll=GUIDE&dl=GUIDE&CFID=6825858&CFTOKEN=77234375.*

(Continued)

Primary Examiner—Nasser Moazzami
Assistant Examiner—Ronald Baum
(74) Attorney, Agent, or Firm—Nixon & Vanderhye P.C.

(57) ABSTRACT

In a data distribution system, data is divided into a number of application data units. A sequence of keys is generated systematically, and a different key is used to encrypt each data unit at the source. At the receivers, corresponding keys are generated and used to decrypt the data units to gain access to the data. The constructions used to generate the keys are such that an intrinsically limited subset of the entire sequence of keys is made available to the user by communicating a selected combination of one or more seed values.

27 Claims, 19 Drawing Sheets

U.S. PATENT DOCUMENTS 6,931,128 B2 * 8/2005 Roberts ........................ 380/44

FOREIGN PATENT DOCUMENTS

| EP | 483424 A * | 5/1992 |
| EP | 0800293 A2 | 10/1997 |
| WO | WO 99/33242 | 7/1999 |

OTHER PUBLICATIONS

McGrew et al, "Key Establishment in Large Dynamic Groups Using One-Way Function Trees", May 20, 1998, pp. 1-13, Available from internet: URL:http://www.cs.umbc.edu/{sherman Dec. 20, 1999, XP002126220.

* cited by examiner $v_{0,0} \longrightarrow v_{1,0}$ represents $v(1,0)=b(v(0,0))$ $v_{0,0} \oplus v_{G,1} = k_0$ represents $k_0 = c(v(0,0), v(G,1))$

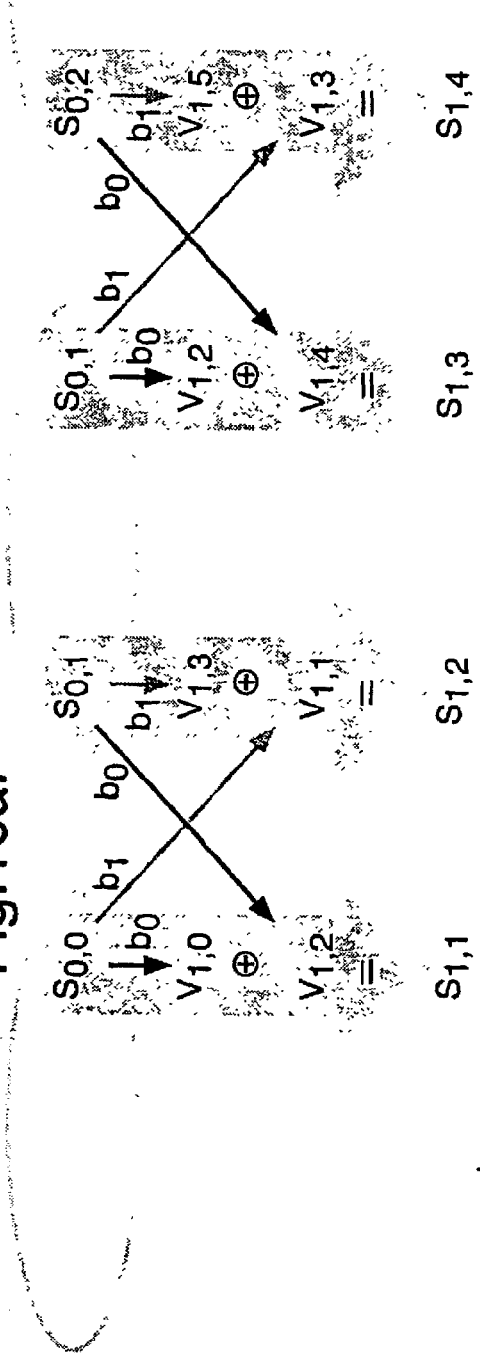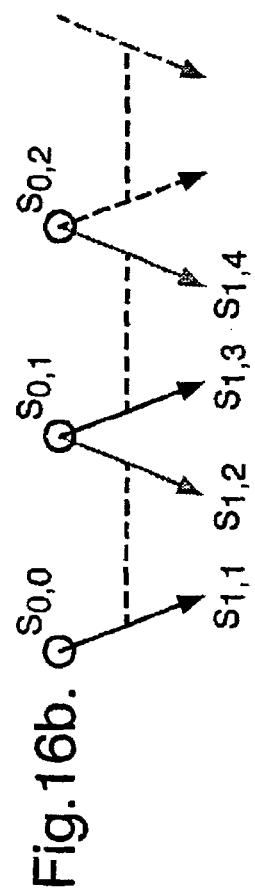
Fig.16a.
Fig.16b.

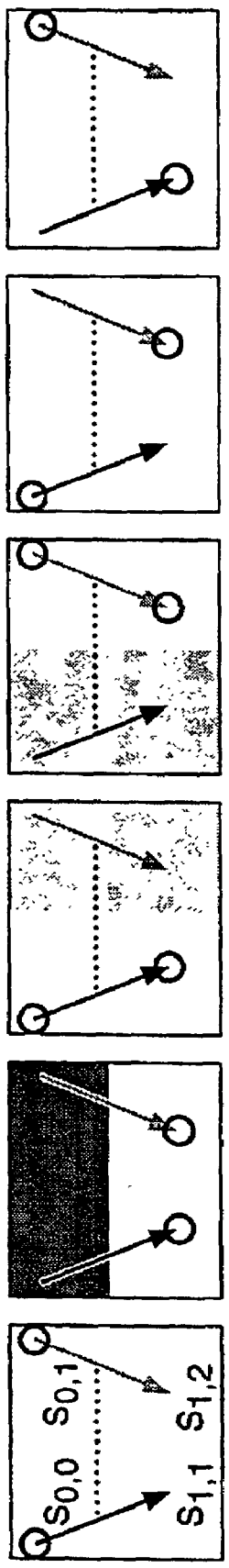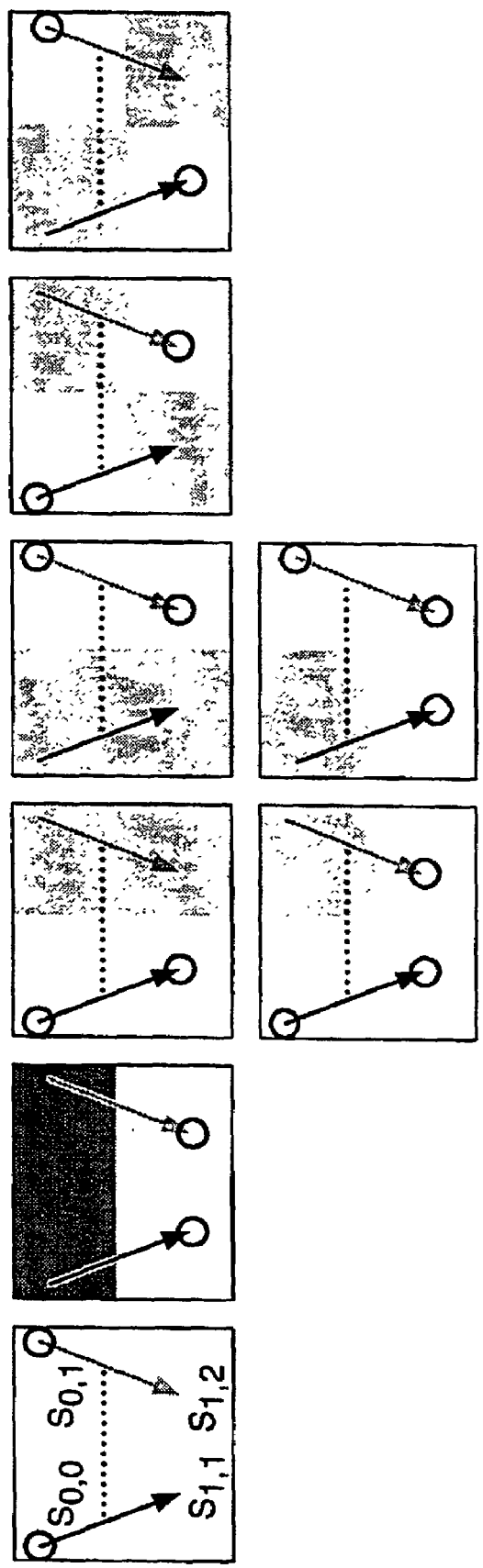

Fig.19.

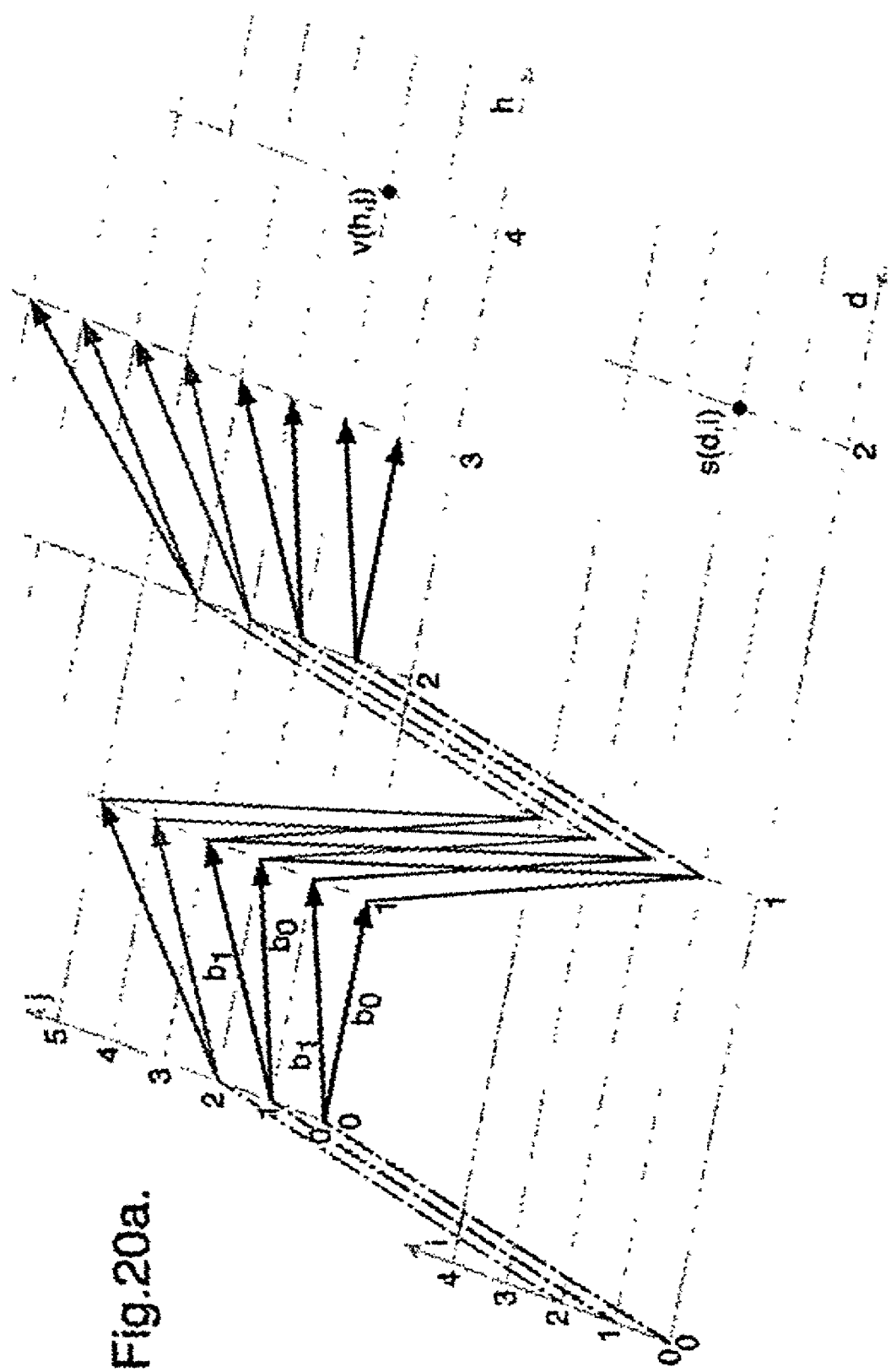

DATA DISTRIBUTION

This application is the US national phase of international application PCT/GB00/02813 filed Jul. 20, 2000 which designated the U.S.

FIELD OF THE INVENTION

The present invention relates to a data distribution system that provides controlled access to data. For example, the system might be used to provide access to multicast audio or video programme material for a limited period of time in return for pre-payment by the user. The invention is however by no means limited to use with multicast packet networks, and might also, for example, be used with other bulk data distribution channels, including storage media such as DVD (digital versatile disk).

BACKGROUND OF THE INVENTION

Multicasting techniques have been developed for use with the Internet that allow efficient distribution of data from a data source to a large number of receivers. However, the efficiency and scalability of existing multicasting protocols depend in part on the fact that the data source does not require any knowledge of the data receivers. This, however, presents problems when it is desired to establish a secure relationship between the data source and the receivers, for example so that streamed video data, such as a television programme, is sent only to subscribers who have paid to receive the programme.

In general, such a secure relationship can be established by encrypting the data at the data source, and then controlling access by users to the keys required to decrypt the data. One simple approach, is to use a single session key for encrypting data. The session key remains unchanged until a new user wishes to access the data, or until one of the existing users is to be excluded. At that point, a new session key is required and that key has to be distributed to all the users. Even though the efficiency of the key distribution scheme can be improved to an extent by using a hierarchy of key, some only of which may need to be changed to exclude or include a particular customer, there is still inevitably with such schemes a significant transmission overhead associated with a new customer joining or leaving the group.

In an alternative approach described in the present applicant's co-pending international patent application PCT/GB98/03753 (BT case: A25728/WO) the data at the data source is divided into a series of application data units (ADUs) and a different key is used for each ADU. The keys are generated systematically as a sequence from an initial seed value. The seed value is also communicated to a secure module at each customer terminal, and that secure module controls the availability of keys to the end users.

BRIEF DESCRIPTION OF THE INVENTION

According to a first aspect of the present invention, there is provided a method of distributing data comprising:
(a) encrypting a plurality of data units each with one of a sequence of keys;
(b) communicating encrypted data units to a plurality of user terminals;
(c) communicating at least one seed value to a user terminal;
(d) generating from the seed value or values a sequence of keys greater in number than the number of seed values communicated to the user terminal; and
(e) decrypting data units at the user terminal using the said sequence of keys, characterised in that in step (d) a sequence of keys constituting an arbitrarily doubly bounded portion of the sequence of keys of step (a) is generated, and in that the position in sequence of the lower and upper bounds of the said portion are determined by the at least one seed value communicated in step (c).

The present invention provides a method of distributing data in which, as in the system disclosed in our above cited co-pending application, successive data units are encrypted using a sequence of different keys. However, the method of the present invention offers further significant advantages, in that the extent of the sequence of keys available to each user is not potentially unlimited, as in the earlier systems, but is doubly bounded, that is to say, the beginning and end of the sequence of keys available to the user are determined in advance. As will be further described below, the data sender, or a key issuing party acting on behalf of the data sender, can determine arbitrarily the starting point and end point and hence the length of the key sequence available to the user by selecting which seed values are sent to the user. For any desired portion of the sequence of keys there exits a set of seeds that will provide access to that portion and to that portion only. By providing the user with access to a doubly bounded set of keys, rather than a potentially limitless set of keys, the invention removes the need to have at each customer terminal a secure module under the control of the data sender to control the user's access to the keys.

Preferably the sequence of keys used in step (a) is generated by:
(A) operating on one or more initial seed values and generating a greater number of intermediate seed values, which intermediate seed values blind the initial seed values:
(B) further operating on the values produced by the preceding step and generating thereby a still greater number of further values, which further values blind the values produced by the preceding step;
(C) iterating step (B) until the number of values produced is equal to or greater than the number of keys required for step (a).

Preferably, the method includes:
(i) operating on a root seed value with each of a set of different blinding functions thereby producing a plurality of further values;
(ii) operating with each of the set of different blinding functions on the further values produced by the preceding step;
(iii) iterating step (ii) and thereby producing, by the or each iteration, a next successive layer in a tree of values;
(iv) in step (a), using as the sequence of keys values derived from the last iteration of step (ii);
(v) in step (c), communicating to a customer at least one value from the tree below the root seed value, the position in the tree of the value communicated to the customer thereby determining the position and extend of the portion of the sequence of keys available to the customer for use in decrypting data units.

A blinding function is a function which operates on an input value to produce an output value where, even when the function is known, the input value cannot readily be derived from the output value. The blinding function might comprise, for example, a cryptographic hash function such as MD5 (message digest number 5).

The inventors have found that a particularly effective way of systematically generating a series of keys while facilitating easy control over the position and extent of the portion of the sequence made available to a user is to generate a tree of values by iterated operations using a set of different blinding functions. In the example described in further detail below, a binary tree formed from a pair of symmetrical blinding functions is used. One function is a right rotational shift followed by a hash function and the other function is a left rotational shift followed by hash function. This feature of the invention is not however limited to use with binary trees, but might also be implemented using ternary or higher order trees.

Preferably in step (c), the seed values are communicated to the customer terminals via a communications network and, in this case, preferably the seed values are communicated to customer terminals from a plurality of key management nodes, which nodes are connected to the network at different respective locations.

Another advantage of the present invention in its preferred embodiments, is that the process of distributing seed values to provide access to the encoded data can be devolved to a number of key management nodes at different locations some or all of which may be remote from the data source. In this way the data control system is made readily scaleable for use with large numbers of receivers.

Typically, the data units and the seed values will be distributed over the same communications network. However, this is not necessarily the case. For example, the data units may be distributed on a bulk data storage medium, such as DVD, with the seed values subsequently being communicated to the customers on-line via the Internet. It will be apparent, that these examples are given by way of illustration only, and that a variety of different implementations may be adopted.

Preferably the seeds required by any receiver to construct the keys for a specific sub-range of the entire key sequence are communicated in an order that implicitly identifies each seed. In this case the indexes of the seeds are inferred from knowledge of the minimum and maximum value required and of the prearranged order for communicating seeds, without explicitly listing the index number of each seed. Preferably each encrypted data unit carries an unencrypted index number to identify to any receiver which key in the sequence should be used to decrypt that data unit.

According to another aspect of the present invention, there is provided a method of encrypting data for distribution comprising:
 (a) operating on at least one root seed value with one or more blinding functions, thereby producing a plurality of further values;
 (b) operating with one or more blinding functions on the further values produced by the preceding step or on values derived therefrom;
 (c) iterating step (b) and thereby producing, by the or each iteration, a next successive layer in a tree of values;
 (d) encrypting a plurality of data units using a sequence of key values derived from one or more of the layers generated by step (c).

According to a further aspect of the present invention, there is provided a method of distributing data comprising encrypting a plurality of data units each with one of a sequence of keys and communicating the encrypted data units to a plurality of user terminals, characterised in that the sequence of keys is generated and allocated to application data units in accordance with a key construction algorithm, and in that copies of the key construction algorithm are distributed to a plurality of key managers so that, in use, receivers may obtain keys for access to an arbitrary portion of the data from a key manager without reference to any data sender or senders.

This aspect of the invention provides an approach to data distribution in which key management can be devolved to a number of key management nodes, allowing the system to be scaled to encompass large numbers of users.

According to another aspect of the present invention, there is provided a data carrier including a plurality of data units encrypted for use in a method in accordance with the preceding aspects. The data carrier might be, for example, a data storage medium such as a DVD disc, a region of computer memory, or a data transmission signal encoded with the data units.

The invention also encompasses customer terminals, data servers and key managers for use with the invention, methods of using such devices and networks including such devices.

BRIEF DESCRIPTION OF THE DRAWINGS

Systems embodying the present invention will now be described in further detail with reference to the accompanying drawings in which;

FIG. 16 shows elements of a second binary hash tree;

FIG. 17 illustrates the revealing and blinding of seed pairs in BHC-T;

FIG. 18 illustrates the revealing and blinding of seeds in the second binary hash tree;

FIG. 19 shows a multi-dimensional key sequence; and

FIGS. 20a to 20e show a common model.

DETAILED DESCRIPTION OF THE INVENTION

Figure 1:
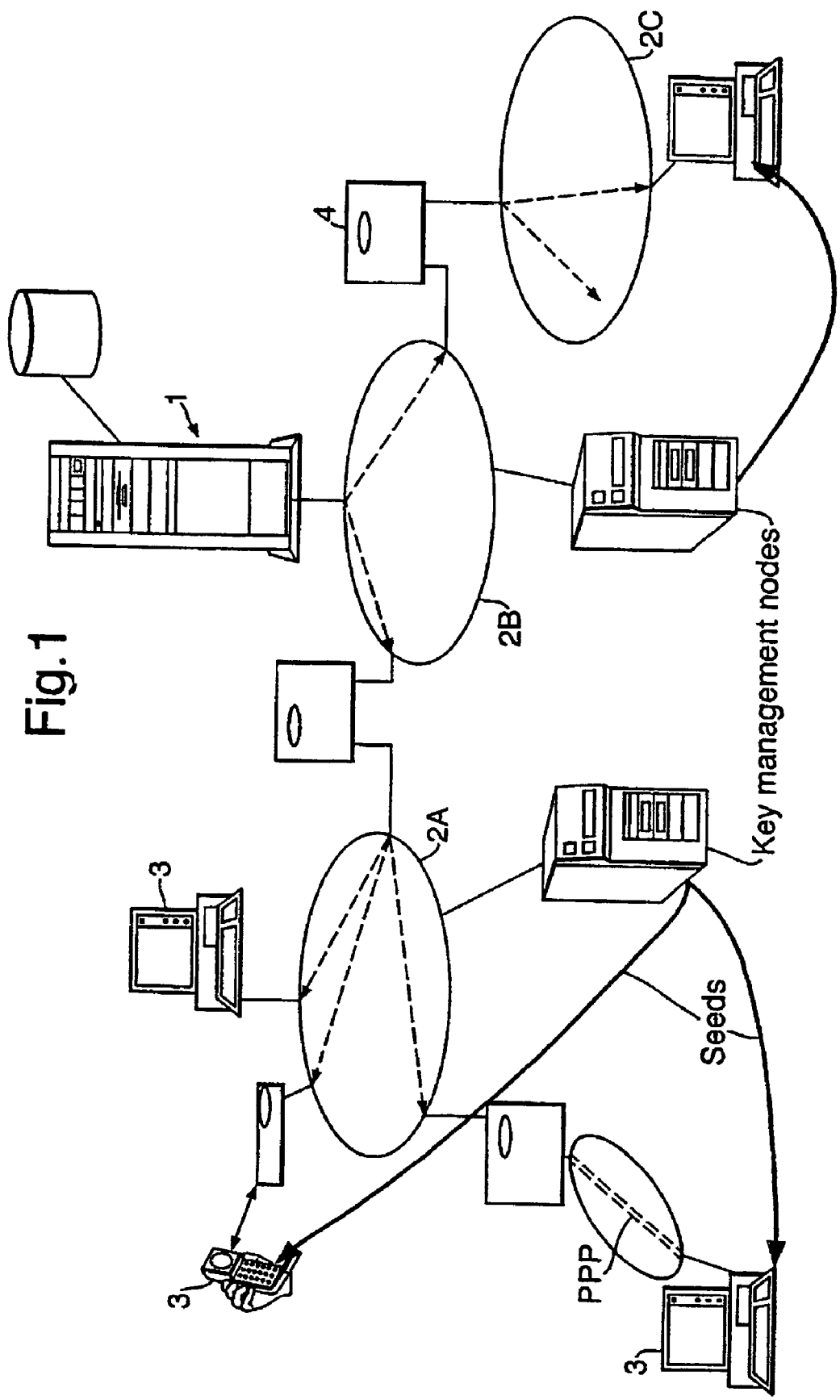
FIG. 1 is a schematic of a network embodying the invention.

A data communications system includes a data server 1 connected via a data communications network 2 to a number of customer terminals 3. Although for ease of illustration only a few customer terminals are shown, in practice the data server 1 may communicate simultaneously with many terminals. In the present example, the data communications network 2 is the public Internet and is formed from a number of sub-networks 2a–2c interconnected by nodes 4. The sub-networks and the associated routers support IP (Internet Protocol) multicasting.

In the present example, the data server 1 is a video server. The data server reads a video data stream from a mass storage device 1a and compresses the data using an appropriate compression algorithm such as MPEG 2. An encryption module in the data server 1 then divides the compressed video data stream into application data units (ADUs). For example, each ADU may comprise data corresponding to one minute of the video signal. An encryption algorithm is then used to encrypt the ADUs with a systematically generated sequence of keys, a different key being used for each ADU. Suitable encryption algorithms include DES (data encryption standard) (US Federal standard FIPSPUB46). This is a conventional private key algorithm. Seed values used in generating the sequence of keys are also communicated from the data server 1 to a number of key management nodes. The key management nodes are spread through the data communications network at different locations. In response to a request from one of the customer terminals, a key management node communicates to the terminal a number of seed values. Before issuing the seed values the respective key management node may carry out a check, for example, to establish that the relevant customer terminal has a right to access the requested data. For example, the customer may have requested access rights to a particular film being multicast from the video data server 1. Where this film is made available on a pay-per-view basis, then the key management node is responsible for checking that the customer has an account with the operator of the video data server and has made the appropriate prepayment for the film. If these conditions have been met, then the key management node issues to the customer seed values selected to allow the customer to generate keys corresponding to the portion of the key sequence used at the data server to encrypt the ADUs making up the film. As will be further described below, the algorithms used for the generation of the key sequences are such that an appropriate selection of seed values can be used to provide access to an arbitrarily bounded portion of the original key sequence.

Figure 2:
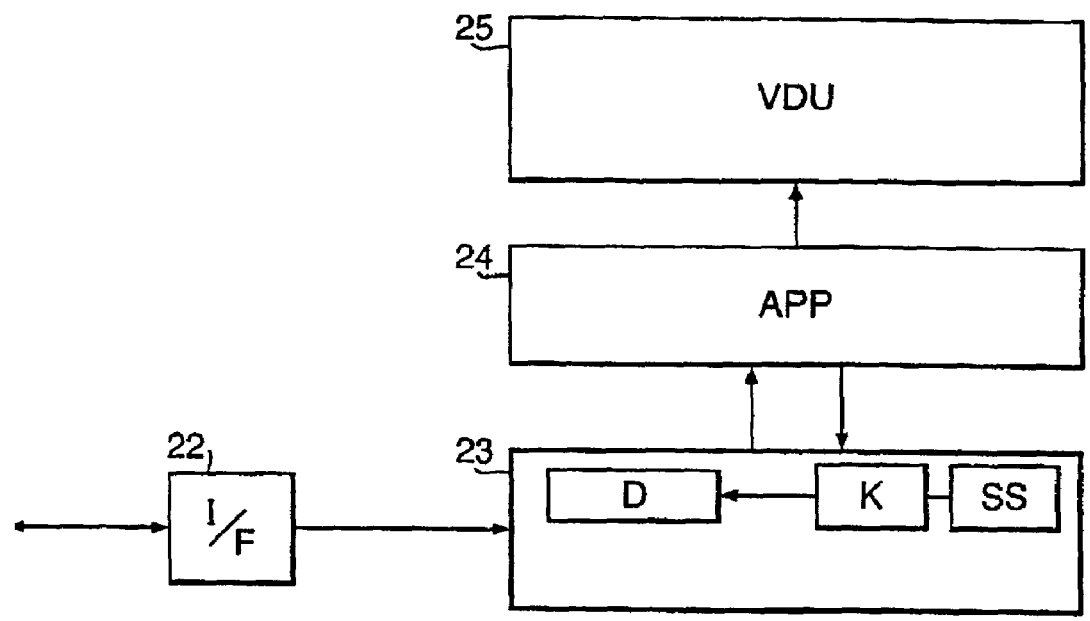
FIG. 2 is a diagram showing the architecture of a customer terminal for use with the network of FIG. 1.

FIG. 2 shows the principal functional components of one of the customer terminals 3. A network interface 22 communicates ADUs to and from the data communications network 2. The ADUs pass from the interface 22 to an access module 23. By contrast with previous systems where the access module 23 may have been located within a separate secure module, for example, on a smart card, in systems embodying the present invention, the access module may simply be a software module running on the main processor of the customer terminals. The access module 23 comprises a decryption module D, a key generation module K and a seed store SS. The seed store stores the seed values received from the key management node and processes those seed values using a key construction algorithm, such as those described in further detail below, to generate a series of keys. The series of keys has a start point and an end point determined by the seed values held in the seed store SS. Keys from this sequence are passed sequentially to the decryption module D. The decryption module D decrypts a series of ADUs received from the interface 22, and passes these to an application layer module 24. This carries out further processing, for example using an MPEG2 decryption algorithm, and passes the resulting data to an output device, which in this example is a video display unit VDU 25. In a preferred implementation, the interface 22 may be embodied in hardware by an ISDN modem and in software by a TCP-IP (Transport Control Protocol—Internet Protocol) stack.

The customer terminal may be embodied in any one of a number of forms. For example, terminals may include personal computers with appropriate network interfaces, intelligent mobile phones, and set-top boxes designed to provide Internet access in conjunction with a television.

Figure 3:
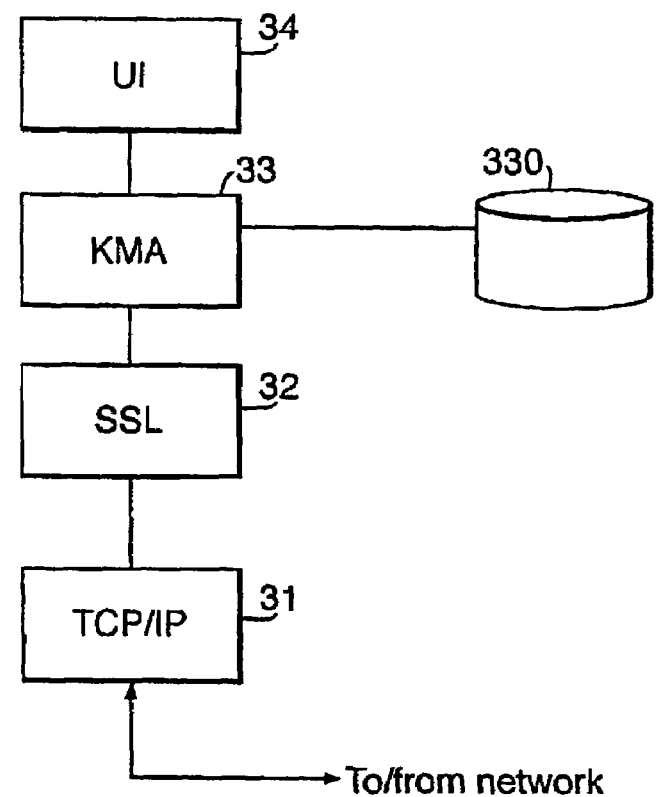
FIG. 3 is a diagram showing the architecture of a key management node for use with the network of FIG. 1.

FIG. 3 shows the architecture of one example of a key management node for use in the network of FIG. 1. The node communicates packets both with the data sender and with customer terminals or "receivers" via a TCP-IP stack. Packets are communicated over a secure sockets layer (SSL) 32, using a public key encryption algorithm in a conventional fashion. A key management application 33 receives seed values from data senders and issues send values to customer terminals in the manner described further in detail below. A data store 330 associated with the key management application 33 holds the seed values received from the or each data sender. Users interact with the key management application via a user interface 34 that may, for example, use HTML (hypertext mark-up language) and CGI to server web pages to customer terminals.

Figure 4:
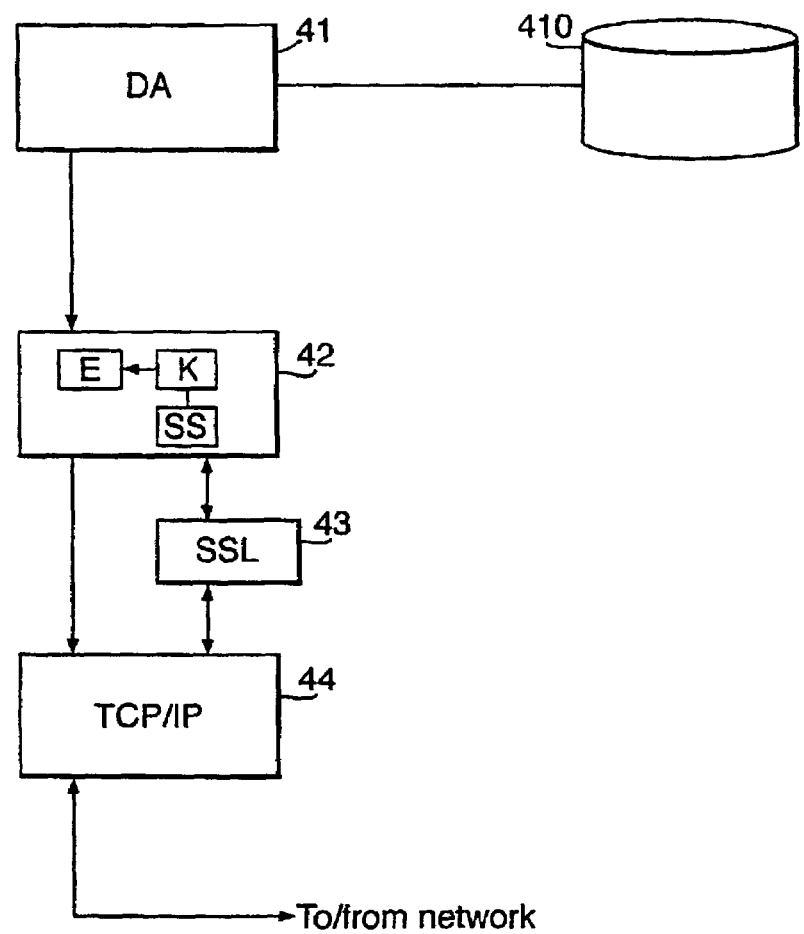
FIG. 4 is a diagram showing the architecture of a data sender for use with network of FIG. 1.

FIG. 4 shown the architecture of one example of a data sender for use in the network of FIG. 1. A data application 41 outputs data which, in the present example, comprises an MPEG2 video stream divided into application data units. The video programme material is derived from a store 410. The ADUs are passed to an access module 42. This includes an encryption sub-module, a key generation sub-module K and a seed store SS. The submodule K generates a sequence of keys using randomly generated seed values in conjunction with key construction algorithms such as those described in further detail below. Seed values may also be output from the access module 42 via a secure socket layer 43 and TCP-IP stack 44. Encrypted ADUs are also output via the TCP-IP stack 44.

Both the data server and the key management nodes may be implemented using commercially available platforms, such as COMPAQ Proliant™ servers or Sun Microsystems Enterprise 5000™ servers.

Figure 5:
FIG. 5 is a diagram showing the format of a data packet transmitted on the network of FIG. 1.

FIG. 5 shows the format of one of the data frames output by a data sender. This includes a data payload carrying the encrypted ADU, a key index $k_i$ and a session identifier SE. The key index and session identifier are sent in the clear.

Typically the key values may be distributed to the customer terminals over the same communications network as that used for the distribution of the ADUs.

The term "application data unit"(ADU) is used in this document to describe the minimum unit of data that is useful from a security or commercial point of view. The size of an ADU may vary according to the application and security required. It may be an initialisation frame and an associated set of "P-frames" in a video sequence, or it may be ten minutes of access to a network game. The ADU used for encryption may be different from that used at different layers of an application. For example, in the present example the ADUs have a different duration to the video frames processed by the MPEG compression algorithm, and a different duration again from the individual programme items purchased by customer. To enhance the performance of the system, an ADU may be only partially encrypted, with the remainder sent in the clear. ADU size may be varied through the duration of a stream dependent on the content. The size of the application data units is a primary determinant of system scalability if a million receivers where to join a multicast data stream within fifteen minutes, but the ADU size was also 15 minutes, then this would only require one re-key event. Different key sequence construction algorithms will now be described in further detail.

Sender-decoupled Architecture

The invention is not limited to use with a simple time-sequence as in the method of FIG. 1. For example, the invention may be applied to a large-scale network game.

In such a game, the financial value of an ADU doesn't relate to time or data volume, but only to a completely application-specific factor. In this example, participation is charged per 'game-minute', a duration that is not strictly related to real-time minutes, but is defined and signalled by the game time-keeper. The game consists of many virtual zones, each moderated by a different zone controller. The zone controllers provide the background events and data that bring the zone to life. They send this data encrypted on a multicast address per zone, but the same ADU index and hence key is used at any one time in all zones. Thus the whole game is one single secure multicast session despite being spread across many multicast addresses. Players can tune in to the background data for any zone as long as they have the current key. The foreground events created by the players in the zone are not encrypted, but they are meaningless without reference to this background data.

Figure 6:
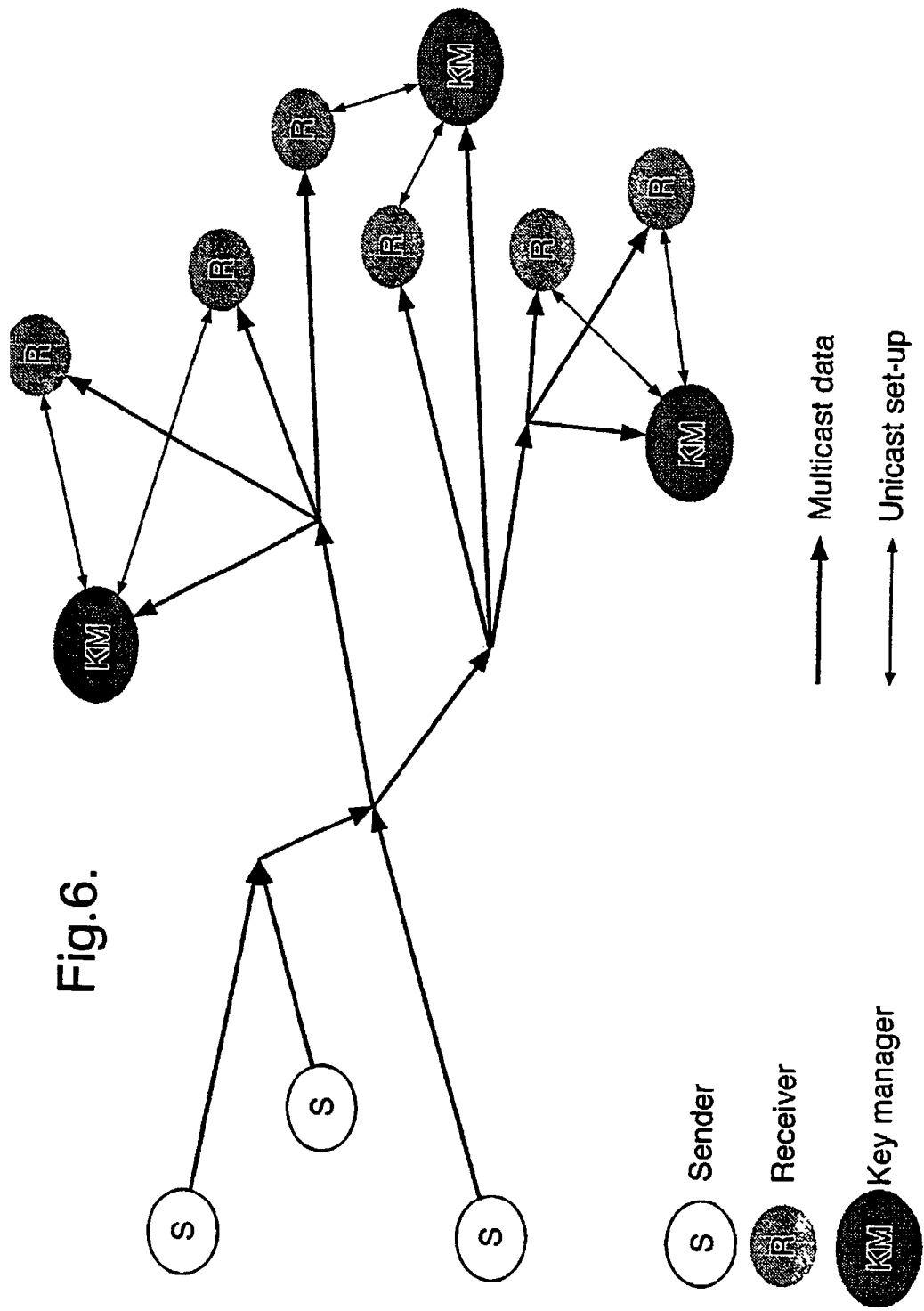
FIG. 6 is a diagram showing the distribution of keys via key management nodes.

FIG. 6 shows data flows in such a game. Only flows relevant to game security and only those sent once the game is in progress, not during set-up, are shown. All players are sending data, but the figure only shows encrypting senders, S—the zone controllers. Similarly, only receivers that decrypt, R, are shown—the game players. A game controller sets up the game security, which is not shown in the Figure, but is described below. Key management operations are delegated to a number of replicated key managers, KM, that use secure Web server technology.

The key to the secure multicast session is changed every game-minute (every ADU) in a sequence. All encrypted data is headed by an ADU index in the clear, which refers to the key needed to decrypt it. After the set-up phase, the game controller, zone controllers and key managers hold initial seeds that enable them to calculate the sequence of keys to be used for the entire duration of the game. Alternatively a staged set-up may be used.

Game Set-up

1. The game controller (not shown) unicasts a shared 'control session key' to all KM and S after satisfying itself of the authenticity of their identity. All S as well as all KM run secure Web servers so that the session key can be sent to each of them encrypted with each public key using client authenticated secure sockets layer (SSL) communications. The game controller also notifies all KM and S of the multicast address it will use for control messages, which they immediately join.
2. The game controller then generates the initial seeds to construct the entire key sequence and multicasts them to all KM and all S, encrypting the message with the control session key and using a reliable multicast protocol suitable for the probably small number of targets involved.
3. The game is announced in an authenticated session directory announcement as described in Mark Handley (UCL), "On Scalable Internet Multimedia Conferencing Systems", PhD thesis (14 Nov. 1997) regularly repeated over multicast (not shown). Authenticated announcement prevents an attacker setting up spoof payment servers to collect the game's revenues. The announcement protocol is enhanced to include details of key manager addresses and the price per game-minute. The key managers listen to this announcement as well as the receivers, in order to get the current price of a game-minute. The announcement must also specify which key sequence construction is in use.

Receiver Session Set-up, Duration and Termination

1. A receiver that wishes to pay to join the game, having heard it advertised in the session directory, contacts a KM Web server requesting a certain number of game-minutes using the appropriate form. This is shown as 'unicast set-up' in FIG. 6. R pays the KM the cost of the requested game-minutes, perhaps giving her credit card details, or paying in some form of e-cash or in tokens won in previous games. In return, KM sends a set of intermediate seeds that will allow R to calculate just the sub-range of the key sequence that she has bought. The key sequence constructions described in the next section make this possible efficiently. All this takes place over secure sockets layer (SSL) communications with only KM needing authentication, not R.
2. R generates the relevant keys using the intermediate seeds she has bought.
3. R joins the relevant multicasts determined by the game application, one of which is always the encrypted background zone data from one S. R uses the key sequence calculated in the previous step to decrypt these messages, thus making the rest of the game data meaningful.
4. Whenever the time-keeper signals a new game-minute (over the control multicast), all the zone controllers increment their ADU index and use the next key in the sequence. They all use the same ADU index. Each R notices that the ADU index in the messages from S has been incremented and uses the appropriate next key in the sequence.
5. When the game-minute index approaches the end of the sequence that R has bought, the application gives the player an 'Insert coins' warning before she loses access. The game-minutes continue to increment until the point is reached where the key required is outside the range that R can feasibly calculate. If R has not bought more game-minutes, she has to drop out of the game.

This scenario illustrates how senders can be completely decoupled from all receiver join and leave activity as long as key managers know the financial value of each ADU index or the access policy to each ADU through some prearrangement. There is no need for any communication between key managers and senders. Senders never need to hear about any receiver activity. If key managers need to avoid selling ADUs that have already been transmitted, they merely need to synchronise with the changing stream of ADU sequence numbers from senders. In the example, key managers synchronise by listening in to the multicast data itself. In other scenarios, synchronisation may be purely time-based, either via explicit synchronisation signals or implicitly by time-of-day synchronisation. In yet other scenarios (e.g. multicast distribution of commercial software), the time of transmission may be irrelevant. For instance, the transmission may be regularly repeated, with receivers being sold keys to a part of the sequence that they can tune in to at any later time.

In this example, pre-payment is used to buy seeds. This ensures key managers hold no state about their customers. This means they can be infinitely replicated as no central state repository is required, as would otherwise be the case if seeds were bought on account and the customer's account status needed to be checked.

Different methods of key construction are now described.

Key Sequence Construction

In all the key sequence constructions below, the following notations are used:

b(v) is the notation used for a function that blinds the value of v. That is, a computationally limited adversary cannot find v from b(v). An example of a blinding or one-way function is a hash function such as the MD5 hash [IETF RFC1321] or the standard Secure Hash 1 [NIST Sha-1]. Good hash functions typically require only lightweight computational resources. Hash functions are designed to reduce an input of any size to a fixed size output. In all cases, we will use an input that is already the same size as the output, merely using the blinding property of the hash, not the size reduction property.

$b^h(v)$ means the function b( ) applied repeatedly to the previous result, h times in all.

r(v) is any computationally fast one-tone function that maps from a set of input values to itself. A circular (rotary) bit shift is an example of such a function.

$c(v_1, v_2, \ldots)$ is a function that combines the values of $v_1$, $v_2$ etc. such that given the result and all but one of the operands, the remaining operand can be trivially deduced. c( ) should also be chosen such that, if the bits of the operands are independent and unbiased, the bits of the result will also be independent and unbiased. The XOR function is a simple example of such a combinatorial function. c( ) should also ideally be the function that can be used to trivially deduce the remaining operand, as is the case with XOR, that is: $v_1=c(c(v_1, v_2, \ldots), v_2, \ldots)$.

A common model for all the constructions will be presented in Section 4.5, but it is clearer to introduce each scheme on its own terms first.

Bi-directional Hash Chain (BHC)

The bi-directional hash chain construction only proves to be secure in a limited form, but we persist in describing it as the limited version forms the basis of a later scheme. There may also be scenarios where the unlimited form is of use:

1. The sender randomly generates two initial seed values, v(0,0) & v(0,1). As a concrete example, we will take these values as 128 bits wide.
2. The sender decides on the required maximum key sequence length, H
3. The sender repeatedly applies the same blinding function to each seed to produce two seed chains of equal length, H. The values are therefore v(0,0) to v(H-1,0) and v(0,1) to v(H-1,1). As the term H-1 appears frequently, for brevity, we will introduce another constant G=H-1.

Thus formally, $v(h,0)=b^h(v(0,0))$; $v(h,1)=b^h(v(0,1))$ (4.1.1).

4. To produce key, $k_0$, the sender combines the first seed from chain zero, v(0,0), with last from chain one, v(G,1).

To produce key, $k_1$, the sender combines the second seed from chain zero, v(1,0), with penultimate from chain one, v(G-1,1) etc.

Formally, $k_h=c(v(h,0), v(G-h,1))$ (4.1.2)

Strictly, the stream cipher in use may not require 128 b keys, therefore a shorter key may be derived from the result of this combination by truncation of the most (or least) significant bits, typically to 64b. The choice of stream cipher is irrelevant as long as it is fast and secure.

5. The sender starts multicasting the stream, encrypting $ADU_0$ (application data unit 0) with $k_0$, $ADU_1$, with $k_1$ etc. but leaving at least the ADU sequence number in the clear.
6. If the sender delegates key management, it must privately communicate the two initial seed values to the key managers. New initial seed pairs can be generated and communicated to key managers in parallel to streaming data encrypted with keys calculated earlier.

A receiver reconstructs a portion of the sequence as follows:

1. When a receiver is granted access from $ADU_m$ to $ADU_n$, the sender (or a key manager) unicasts seeds v(m,0) and v(G-n,1) to that receiver.
2. That receiver produces seed chains v(m,0) to v(n,0) and v(G-n,1) to v(G-m,1) by repeatedly applying the blinding function to the seeds sent using (4.1.1).
3. The receiver produces keys $k_m$ to $k_n$, using (4.1.2) as the sender did.

However, any seeds v(h,0) where (h<m) or v(h,1) where (h n), cannot feasibly be know by this receiver without an exhaustive search of the blinded seeds that 'precede' those the sender has revealed. Therefore, keys outside the range $k_n$ to $k_m$ cannot feasibly be calculated by this receiver.

4. Any other receiver can be given access to a completely different range of ADUs by sending the relevant seeds at the bounds of that range; the 'start' seed from the first chain and the 'end' seed from the second chain.

Figure 7:
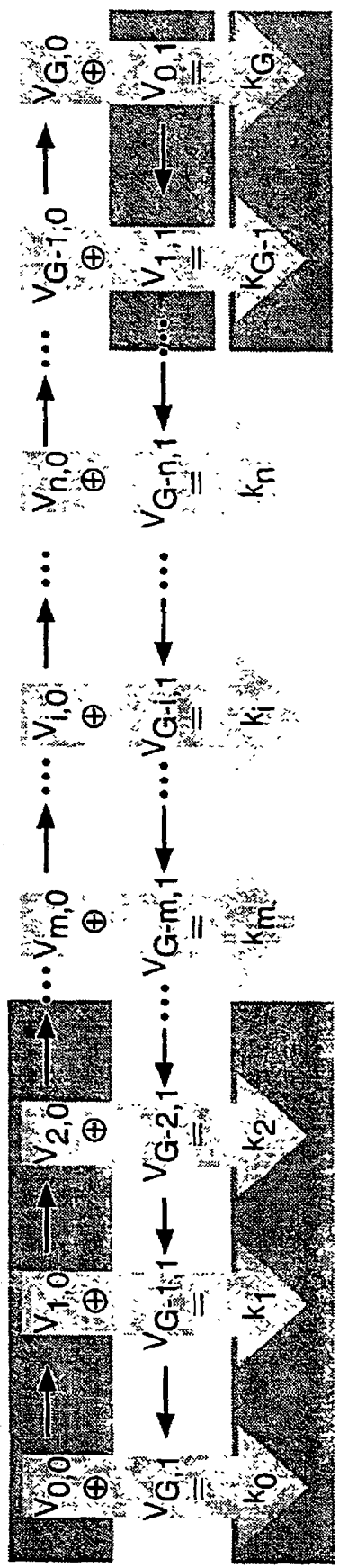
FIG. 7 is a diagram showing a bi-directional hash chain.

In FIG. 7 the ranges of seeds with a dark grey background represent those blinded from the first mentioned receiver. This leads to the keys with a dark grey background also being blinded from this receiver.

Therefore, each receiver can be given access to any contiguous range of keys by sending just two seeds per receiver per session. Unfortunately, this construction is of limited use unless each receiver can be restricted to only ever having one range of keys revealed within one sender sequence. If a receiver is granted access to an early range then another later range (say $k_0$ to $k_1$ then $k_{G-1}$ to $k_G$) it can then calculate all the values between the two ($k_0$ to $k_G$). This is because seeds v(0,0), v(G-1,1), v(G-1,0) and v(G,1) will have had to be revealed, but v(0,0) and v(G,1) alone reveal the whole sequence.

One way round this restriction is to regularly restart the second chain with a new seed value (i.e. keeping H low) and to disallow two accesses for one receiver within H ADUs of each other However, this requires holding per customer state at the key manager. There may be niche applications where this scheme is appropriate, such as commercial models where customers can only extend a subscription, not withdraw then re-instate it. In such cases, this would be an extremely efficient scheme. A second way round this restriction is to note that two disjoint chains are only possible if there is room for a gap between two minimally short chains. In other words, a chain with H<4 will always be secure.

Such a short chain doesn't seem much use, but later we will use this feature to build a hybrid construction from short BHC fragments.

Binary Hash Tree (BHT)

Figure 8:
FIG. 8 is a diagram showing the generation of two blinding functions.

The binary hash tree requires two blinding functions, $b_0(\ )$ and $b_1(\ )$, to be well-known. We will term these the 'left' and the 'right' blinding functions. Typically they could be constructed from a single blinding function, $b(\ )$, by applying one of two simple one-to-one functions, $r_0(\ )$ and $r_1(\ )$ before the blinding function. As illustrated in FIG. 8. Thus:

$$b_0(s)=b(r_0(s));\ b_1(s)=b(r_1(s))$$

For instance, the first well-known blinding function could be a one bit left circular shift followed by an MD5 hash, while the second blinding function could be a one bit right circular shift followed by an MD5 hash. Other alternatives might be to precede one blinding function with an XOR with 1 or a concatenation with a well-known word. It seems advantageous to choose two functions that consume minimal but equal amounts of processor resource as this balances the load in all cases and limits the susceptibility to covert channels that would otherwise appear given the level of processor load would reveal the choice of function being executed. Alternatively, for efficiency, two variants of a hash function could be used, e.g. MD5 with two different initialisation vectors. However, it seems ill-advised to tamper with tried-and-tested algorithms.

This key sequence is constructed as follows:

1. The sender randomly generates an initial seed value, $s(\mathbf{0},\mathbf{0})$, at random. Again, as a concrete example, we will take its value as 128 bits wide.
2. The sender decides on the required maximum tree depth, D, which will lead to a maximum key sequence length, $N_0=2^D$ before a new initial seed is required.
3. The sender generates two 'left' and 'right' first level intermediate seed values, applying respectively the 'left' and the 'right' blinding functions to the initial seed:

$$s(1,0)=b_0(s(0,0));\ s(1,1)=b_1(s(0,0)).$$

The sender generates four second level intermediate seed values:

$$s(2,0)=b_0(s(1,0));\ s(2,1)=b_1(s(1,0));$$

$$s(2,2)=b_0(s(1,1));\ s(2,3)=b_1(s(1,1)),$$

and so on, creating a binary tree of intermediate seed values to a depth of D levels.

Formally, if $s_{d,i}$ is an intermediate seed that is d levels below the initial seed, $S_{0,0}$:

$$s_{d,i}=b_p(s_{(d-1),\ i/2}) \quad (4.2.1)$$

where p=0 for even i and p=1 for odd 1

4. The key sequence is then constructed from the seed values across the leaves of the tree or truncated derivations of them as before.

That is, if D=5, $k_0=s(5,0)$; $k_1=s(5,1)$; ... $k_{31}=s(5,31)$.

Formally, $k_i=s_{D,i}$ (4.2.2)

5. The sender starts multicasting the stream, encrypting $ADU_0$ with $k_0$, $ADU_1$ with $k_1$ etc. but leaving at least the ADU sequence number in the clear.
6. If the sender delegates key management, it must privately communicate the initial seeds to the key managers. New initial seeds can be generated and communicated to key managers in parallel to streaming data encrypted with keys calculated earlier.

A receiver reconstructs a portion of the sequence as follows:

1. When a receiver is granted access from $ADU_m$ to $ADU_n$, the sender (or a key manager) unicasts a set of seeds to that receiver (e.g. using SSL). The set consists of the intermediate seeds closest to the tree root that enable calculation of the required range of keys without enabling calculation of any key outside the range.

These are identified by testing the indexes, i, of the minimum and maximum seed using the fact that an even index is always a 'left' child, while an odd index is always a 'right' child. A test is performed at each layer of the tree, starting from the leaves and working upwards. A 'right' minimum or a 'left' maximum always needs revealing before moving up a level. If a seed is revealed, the index is shifted inwards by one seed, so that, before moving up a layer, the minimum and maximum are always even and odd respectively. To move up a layer, the minimum and maximum indexes are halved and rounded down if necessary. This ensures the difference between them predictably reduces by two. The odd/even tests are repeated on the new indexes, revealing a 'right' minimum or 'left' maximum as before. The process continues until the minimum and maximum cross or meet They can cross after either or both have been shifted inwards. They can meet after they have both been shifted upwards, in which case the seed where they meet needs revealing before terminating the procedure. This procedure is described more formally, in C-like code in Appendix A.

2. Clearly, each receiver needs to know where each seed it is given resides in the tree. The seeds and their indexes can be explicitly paired when they are revealed. Alternatively, to reduce the bandwidth required, the protocol may specify the order in which seeds are sent so that each index can be calculated implicitly from the minimum and maximum index and the order of the seeds. This is possible because there is only one minimal set of seeds that allow recreation of any one range of keys, Each receiver can then repeat the same pairs of blinding functions on these intermediate seeds as the sender did to re-create the sequence of keys, $k_m$ to $k_n$. (Equations 4.2.1 & 4.2.2)

3. Any other receiver can be given access to a completely different range of ADUs by being sent a different set of intermediate seeds.

Figure 9:
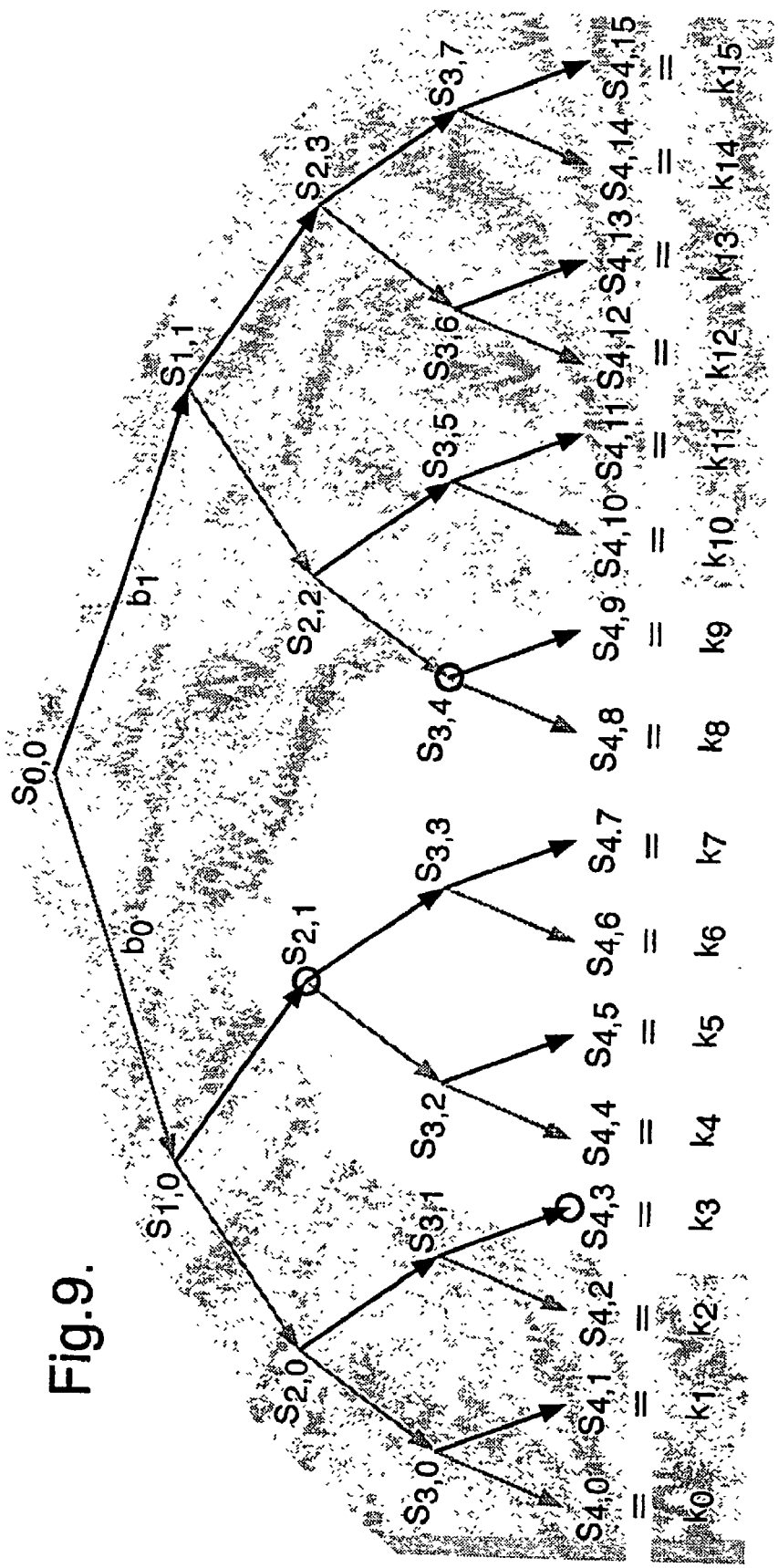
FIG. 9 is a diagram showing a binary hash tree.

The creation of a key sequence with D=4 is graphically represented in FIG. 9:

As an example, we circle the relevant intermediate seeds that allow one receiver to re-create the key sequence from $k_3$ to $k_9$. The seeds and keys that remain blinded from this receiver are shown on a grey background. Of course, a value of D greater than 4 would be typical in practice.

Note that each layer can be assigned an arbitrary value of d as long as it uniquely identifies the layer. Nothing relies on the actual value of d or D. Therefore it is not necessary for the sender to reveal how far the tree extends upwards, thus improving security.

Often a session will have an unknown duration when it starts. Clearly, the choice of D limits the maximum length of key sequence from any one starting point. The simplest work-round is just to generate a new initial seed and start a new binary hash tree alongside the old if it is required. If D is known by all senders and receivers, a range of keys that overflows the maximum key index, $2^D$, will be immediately apparent to all parties. In such cases it would be sensible to allocate a 'tree id' for each new tree and specify this along with the seeds for each tree.

Figure 10:
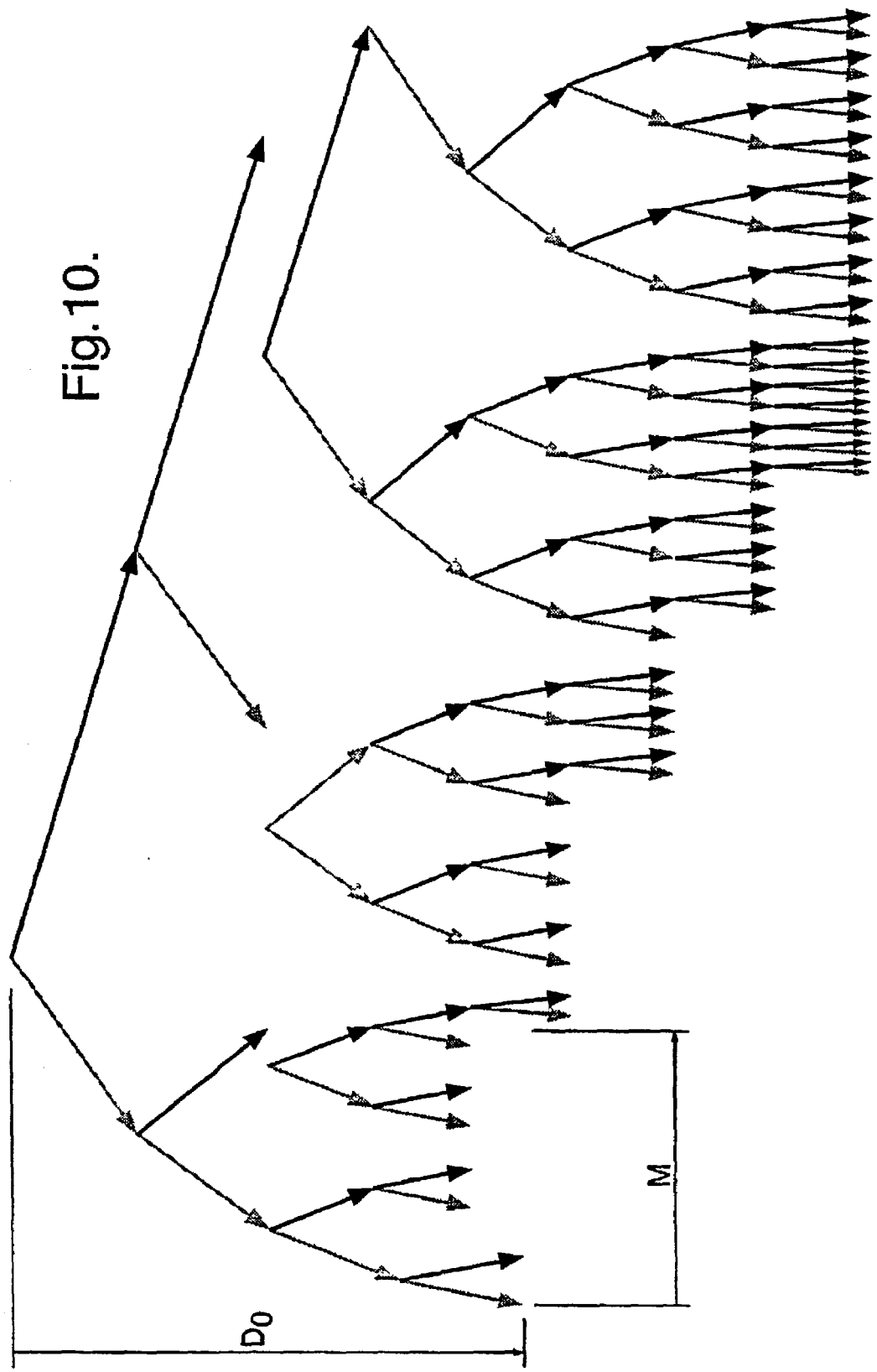
FIG. 10 is a diagram showing a continuous binary hash tree.

Another way to avoid this upper limit, is to make D variable instead of constant, e.g. $D=D_0+f(i)$. FIG. 10 shows such a continuous BHT where $D_0=4$ and where D rises by one every M keys. In this example M takes a fixed value of 7. However, there is little point in adding this complexity as the only seeds common to the different branches of the tree are those along the far right-hand branch of the tree, $s_{d,2}d$. If any of these were ever revealed the whole future tree would have been revealed. Therefore, this 'improvement' can never be used to add efficiency when revealing arbitrary ranges of keys to receivers and all it saves is the sender very occasionally passing a new initial seed in a trivial message to the key managers. On the contrary, it introduces a security weakness, as it creates a set of seeds of 'infinite' value for which any amount of exhaustive searching will be worthwhile. On the other hand, regularly having to generate a new initial seed, as in the first work-round, sets a ceiling on the vulnerability of the BHT to attack.

Binary Hash Chain-tree Hybrid (BHC-T)

This construction is termed hybrid because a binary hash tree (BHT) is built from fragments of bi-directional hash chains (BHCs) that are just two seeds long. For understanding only we will start the explanation building the tree in the root to leaf direction in order to construct a BHC fragment, as shown in FIG. 11. This is for ease of understanding. Later we will recommend the best way to build the tree is from the side rather than the root.

1. Let us assume we have two initial seed values generated randomly, s(0,0) and s(0,1). Again, as a concrete example, we will take their values as 128 bits wide.
2. We now apply the same blinding function to each seed to produce two blinded seeds v(1,0) and v(1,1).
3. To produce child seed, s(1,1), we combine the first seed, s(0,0), with the blinded second seed, v(1,1).
   To produce child seed, s(1,2), we combine the second seed, s(0,1), with the blinded first seed, v(1,0).
4. If we now randomly generate a third initial seed, s(0,2) and blind it to produce v(1,2), we can combine the second and third initial seeds and their opposite blinded values in the same way to produce two more child seeds, s(1,3) and s(1,4). This means that every parent seed produces four children, two when combined (incestuously) with its sibling to one side and the other two when combined with its half-sibling to the other side. In consequence, this construction produces a binary tree if new child seeds are blinded and combined as their parents were because the number of seeds doubles in each generation. However, the tree only branches under the middle of the top row of seeds (assuming more than two initial seeds are created along this row). The edges of the tree 'wither' inwards if built from the top (but see later).

Formally, $$s(d,i)=c(s(d-1,i/2), v(2d-1,i/2+1)) \text{ for odd } i=c(s(d-1,i/2), v(2d-1,i/2-1)) \text{ for even } i \quad (4.3.1)$$

where $$v(h,j)=b(s((h-1)/2, j)).$$

Figure 11A:
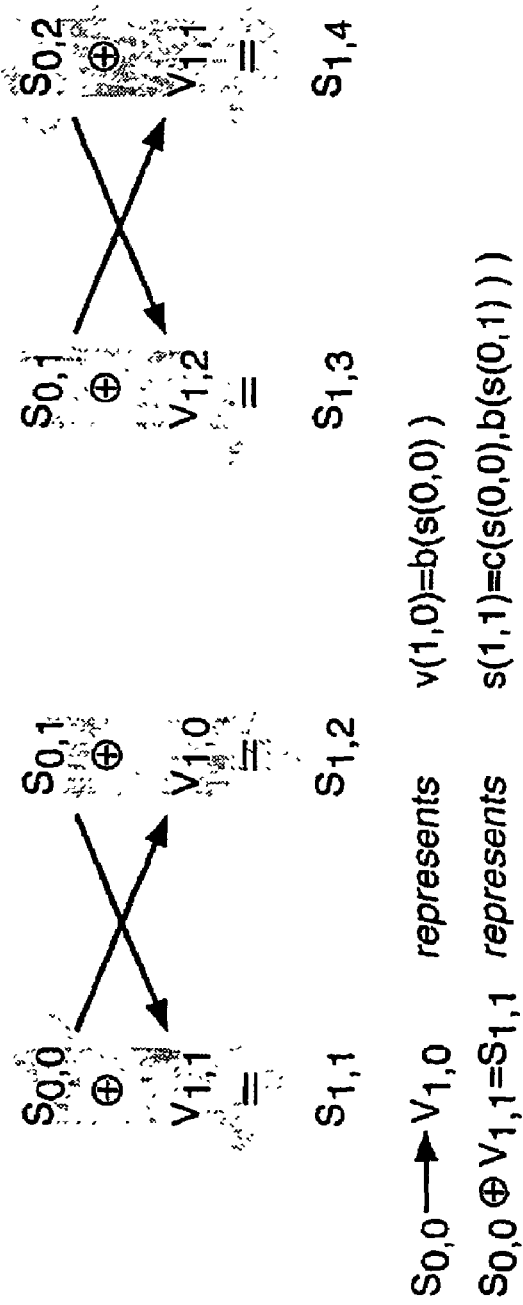
FIG. 11 is a diagram showing elements of a hybrid binary hash chain-tree.
Figure 11B:
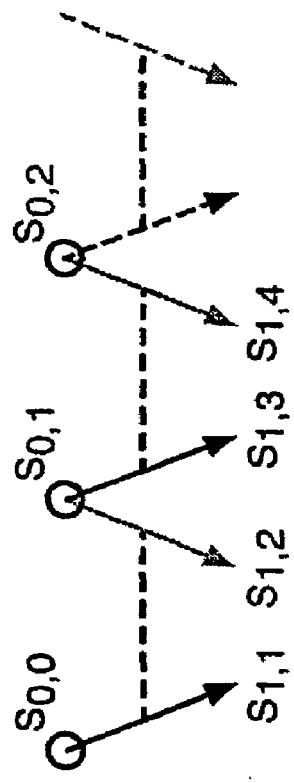

FIG. 11a) illustrates two pairs of parent seeds of the BHC-T hybrid, <s(0,0), s(0.1) and <s(0,1), s(0,2). The rings identify the parent seed that is common to each pair, although the outer values in the outer rings fall off the edge of the diagram, because we focus on the descendants of just the central parent seed, s(0,1). FIG. 11b) shows the same three parents producing the same four children, but hiding the blinded seeds from view as they are never communicated, in order to better illustrate how a binary tree is being formed. The ringed parent seeds in the lower diagram represent the same three ringed seeds shown in the upper diagram. The two dotted arrows that continue the sequence to the right show how parent seed s(0.2) would produce another two children if there were another parent to the right. The dotted lines joining each pair of arrows represent the fact that both parents above this line combine to produce both children below it. We will represent this construction in later diagrams using the simplified form.

Figure 12:
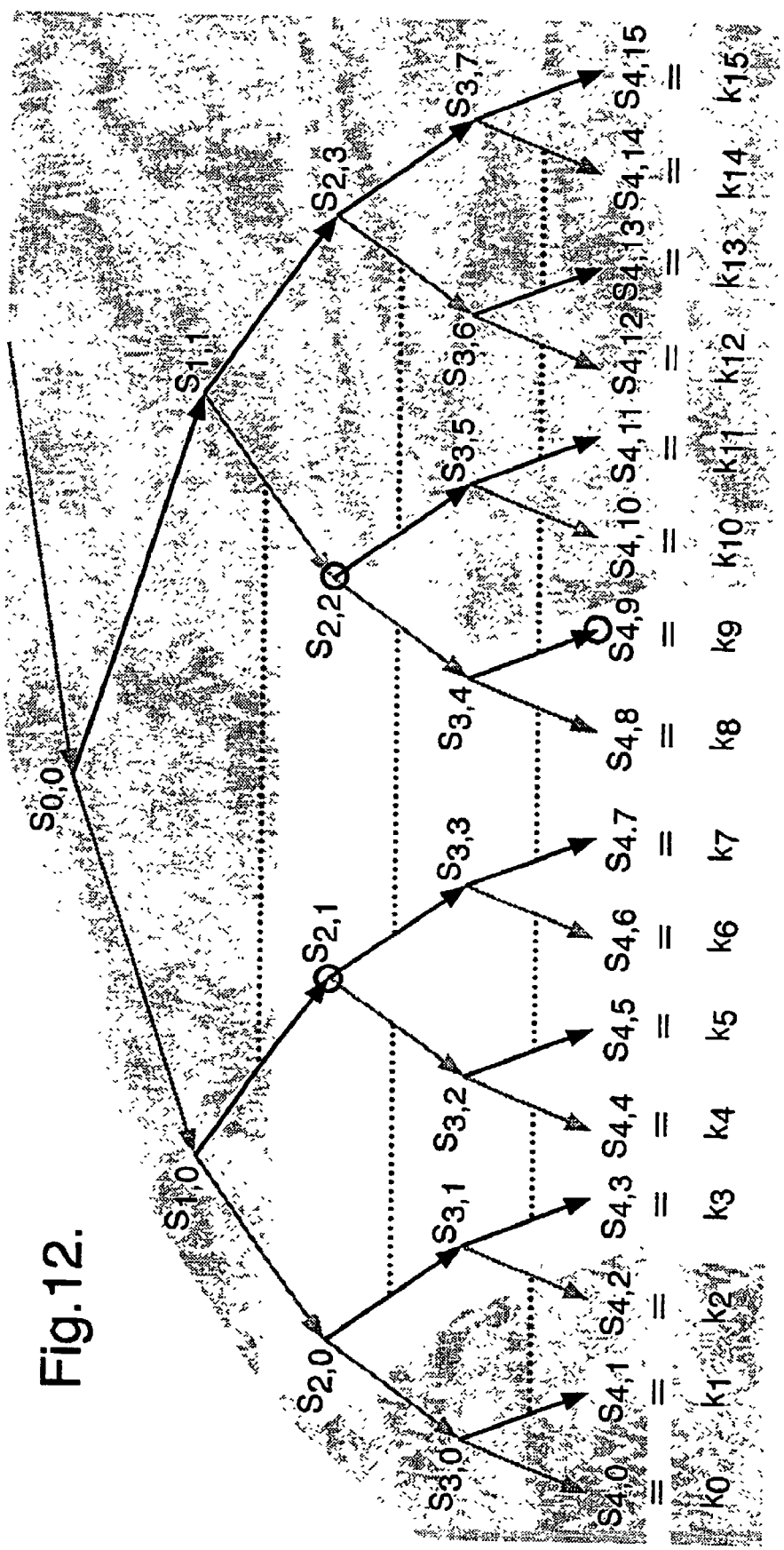
FIG. 12 is a diagram showing a hybrid binary hash chain tree.

FIG. 12 shows part of an example hybrid tree. As with the binary hash tree, the keys used to encrypt successive ADUs are the sequence of seeds at the leaves of the tree or truncated derivations of them. The figure shows how to reveal an example range of keys, $k_3$ to $k_9$ by revealing the ringed seeds to a particular receiver.

Figure 13:
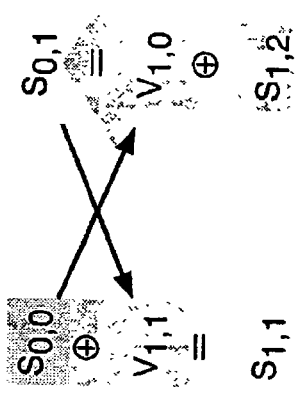
FIG. 13 is a diagram illustrating the construction of the hybrid binary hash chain-tree.

We now move to a further twist in this construction in order to explain how to build the tree from the side rather than the root. It was noted earlier that the XOR function was chosen because if the XOR of two operands produces a third value, any two of these three values may be XORed to produce the third. This is illustrated in FIG. 13, where the values of all the seeds are the same as in FIG. 11. If s(0,1) is initially unknown, but s(0,0) and s(1,2) are known, s(0,1) then s(1,1) may be derived because of this 'twist' property:

$$s(0,1)=c(s(1,2), b(s(0,0))) \text{ then}$$

$$s(1,1)=c(s(0,0), b(s(0,1)))$$

Figure 14:
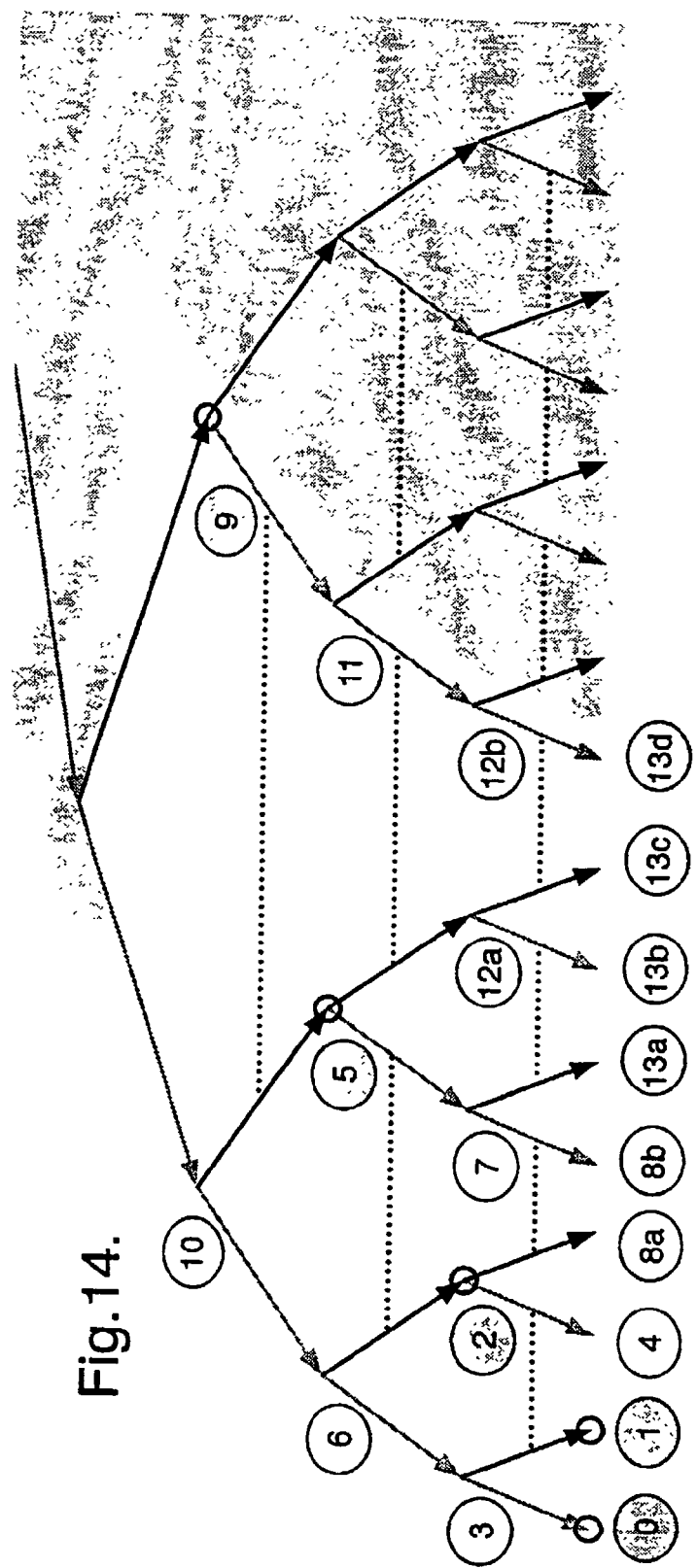
FIG. 14 shows the sequence of growth of a binary hash chain-tree.

FIG. 14 shows how a sender can build the BHC-T hybrid construction from the 'side'. The order of seed creation is shown by numbered circles. Seeds that can be created in any order are all allocated the same number followed by a distinguishing letter. The darker circles next to ringed nodes represent seeds that have to be randomly generated. We shall call these primary seeds. These fix the values of all subsequent intermediate seeds until the next ringed node.

1. The sender randomly generates the 128 bit value of seed 0.
2. Seeds 1 & 2 are then generated. They form the diagonal corners of a box of four seeds, thus setting the opposite corner values, 3 then 4 by the 'twist' algorithms:

Formally, $$s(d1,i/2)=c(s(d,i), v(2d-1,i/2+1)) \text{ for odd } i=c(s(d,i), v(2d-1,i/2-1))) \text{ for even } i \quad (4.3.2)$$

where $$v(h,j)=b(s((h-1)/2, j)).$$

Note that if d=0 for the root seed, d becomes increasingly negative in the leaf to root direction.

3. Seed 5 must then be generated, forming another pair of diagonal corners with 2.
4. This reveals the opposite corners, seeds 6 then 7 by equation (4.3.2).
5. Seeds 7 and 2 then form the top corners of another box of four, setting seeds 8a & 8b by equations (4.3.1).
6. The pattern continues in a similar fashion after seed 9 has been randomly generated. An advantage of this construction is that the tree can grow indefinitely—it is not necessary to decide any limits in advance.

7. The sender starts multicasting the stream, encrypting $ADU_0$ with $k_0$, $ADU_1$ with $k_1$, etc. but leaving at least the ADU sequence number in the clear.

That is, $k_i=s(D,i)$ where $D=0$ (4.3.3)

8. If the sender delegates key management, it must privately communicate the primary seeds to the key managers. New primary seeds can be generated and communicated to key managers in parallel to streaming data encrypted with keys calculated earlier.

A receiver reconstructs a portion of the sequence as follows:

1. When a receiver is granted access from $ADU_m$ to $ADU_n$, the sender (or a key manager) unicasts a set of seeds to that receiver. The set consists of the smallest set of intermediate seeds in the tree that enable calculation of the required range of keys.

These are identified by testing the indexes, i, of the minimum and maximum seed in a similar but mirrored way to the BHT. A 'left' minimum or a 'right' maximum always needs revealing before moving up a level. If a seed is revealed, the index is shifted inwards by one seed, so that, before moving up a layer, the minimum and maximum are always odd and even respectively. To move up a layer, the minimum and maximum indexes are halved and rounded down if necessary. This ensures the difference between them predictably reduces by one. The odd/even tests are repeated on the new indexes. The process continues until the minimum and maximum are two or three apart. If they are two apart they are revealed along with the seed between them. If they are three apart, they are only revealed along with both seeds between them if the minimum is even. If it is odd, it will be worth moving up one more layer so nothing is revealed and one more round is allowed. Before the tests start, exceptional initial conditions are tested for, where the requested range is already less than two wide.

This procedure is described more formally, in alike code in Appendix B.

2. Clearly, each receiver needs to know where each seed it is given resides in the tree. The seeds and their indexes can be explicitly paired when they are revealed. Alternatively, to reduce the bandwidth required, the protocol may specify the order in which seeds are sent so that each index can be calculated implicitly from the minimum and maximum index and the order of the seeds. For instance, the algorithm in Appendix B will always reveal the same seeds in the same order for the same range of keys.

3. Each receiver can then repeat the same pairs of blinding and combining functions on these intermediate seeds as the sender did to recreate the sequence of keys, $k_m$ to $k_n$. (Equations 4.3.1, 4.3.2 & 4.3.3)

4. Any other receiver can be given access to a completely different range of ADUs by being sent a different set of intermediate seeds.

Because the BHC-T can be built from the side, it is ideal for sessions of unknown duration. The continual random generation of new intermediate root seeds limits its vulnerability to attack but allows continuous calculation of the sequence. To further limit vulnerability, the sender could delay the generation of future seeds in order to deny any receiver the ability to calculate keys beyond a certain future point in the sequence. This would limit the time available for a brute force search of the seed-space. Nonetheless, building the tree from the side causes the numbers of keys dependent on each new root seed (and consequently the value of an attack on that seed) to grow exponentially.

The value of a root seed can be bounded by regularly incrementing the level defined to be the leaf level, moving it one layer closer to the root after each sequence of M keys (except the first).

Formally this requires equation (4.3.3) to be replaced with:

$k_i=s(-i/M,i)$ for $i<M$ $k_i=s(1-i/M,i)$ for $i=M$ (4.3.4)

Figure 15:
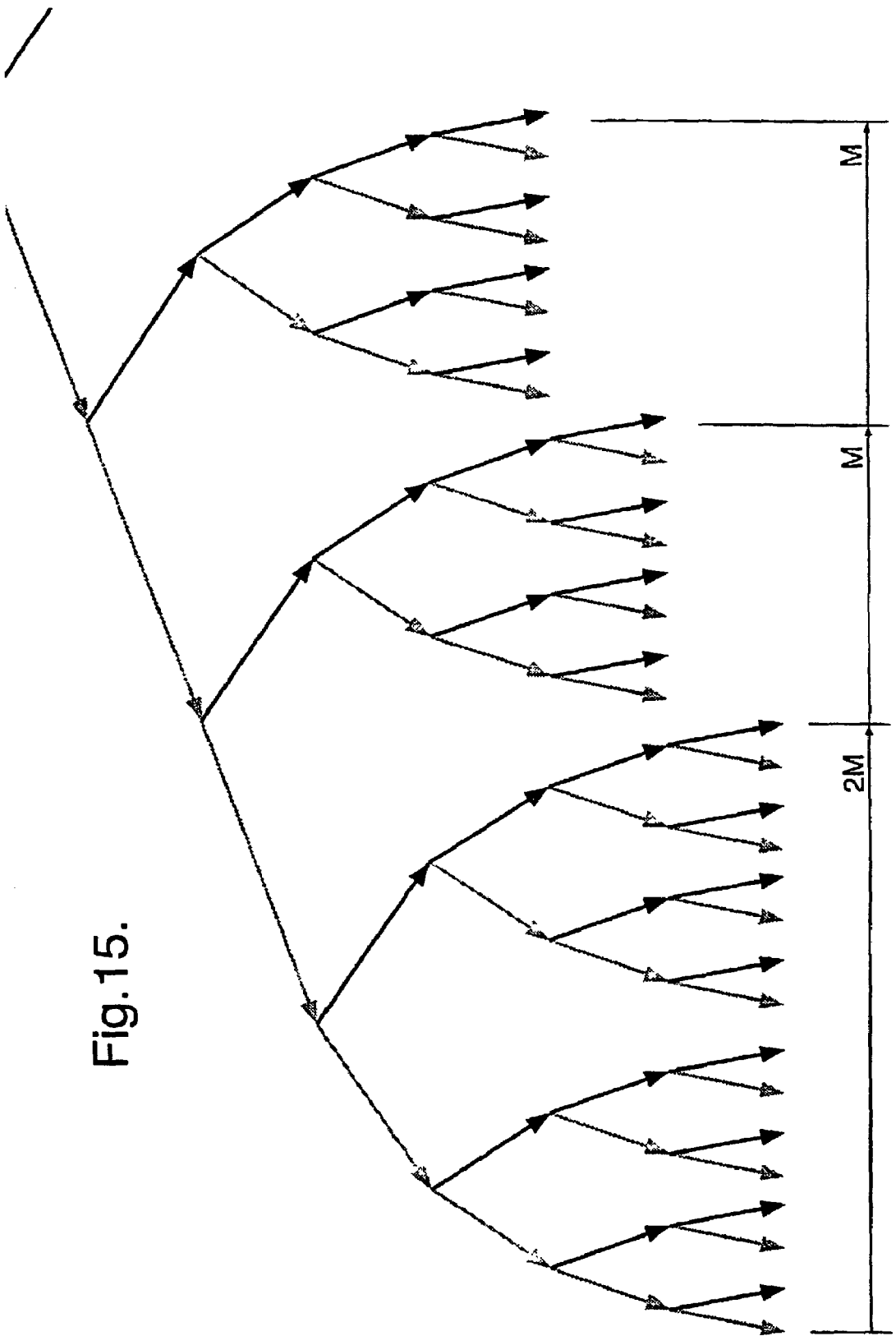
FIG. 15 shows a continuous binary hash chain-tree hybrid.

This is illustrated in FIG. 15 with M=8. Of course, in practice M would be a lot larger in order to ensure all reasonable length receiver sessions could be described efficiently without hitting the top left-hand branch of the tree.

Figure 20B:
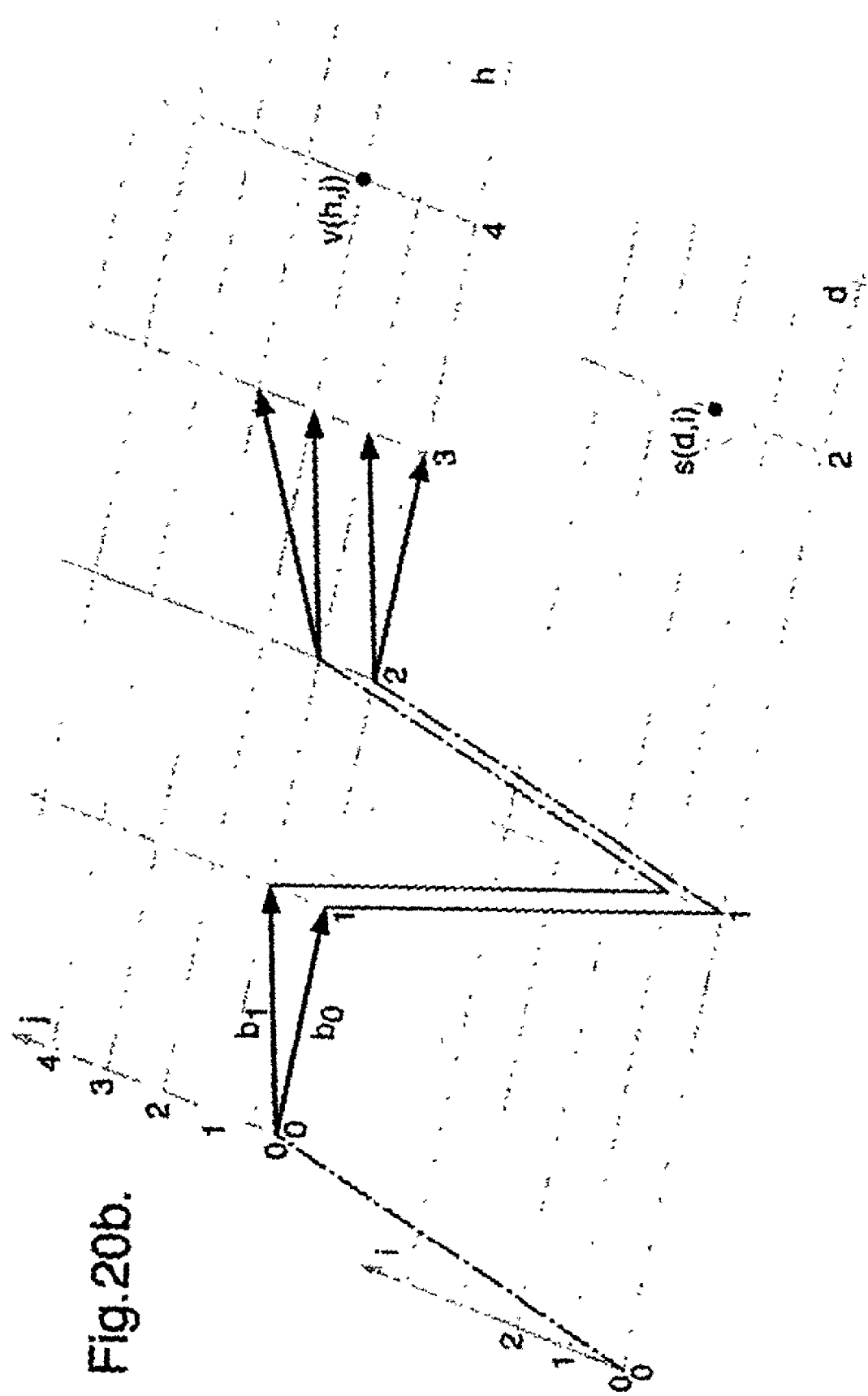
Figure 20C:
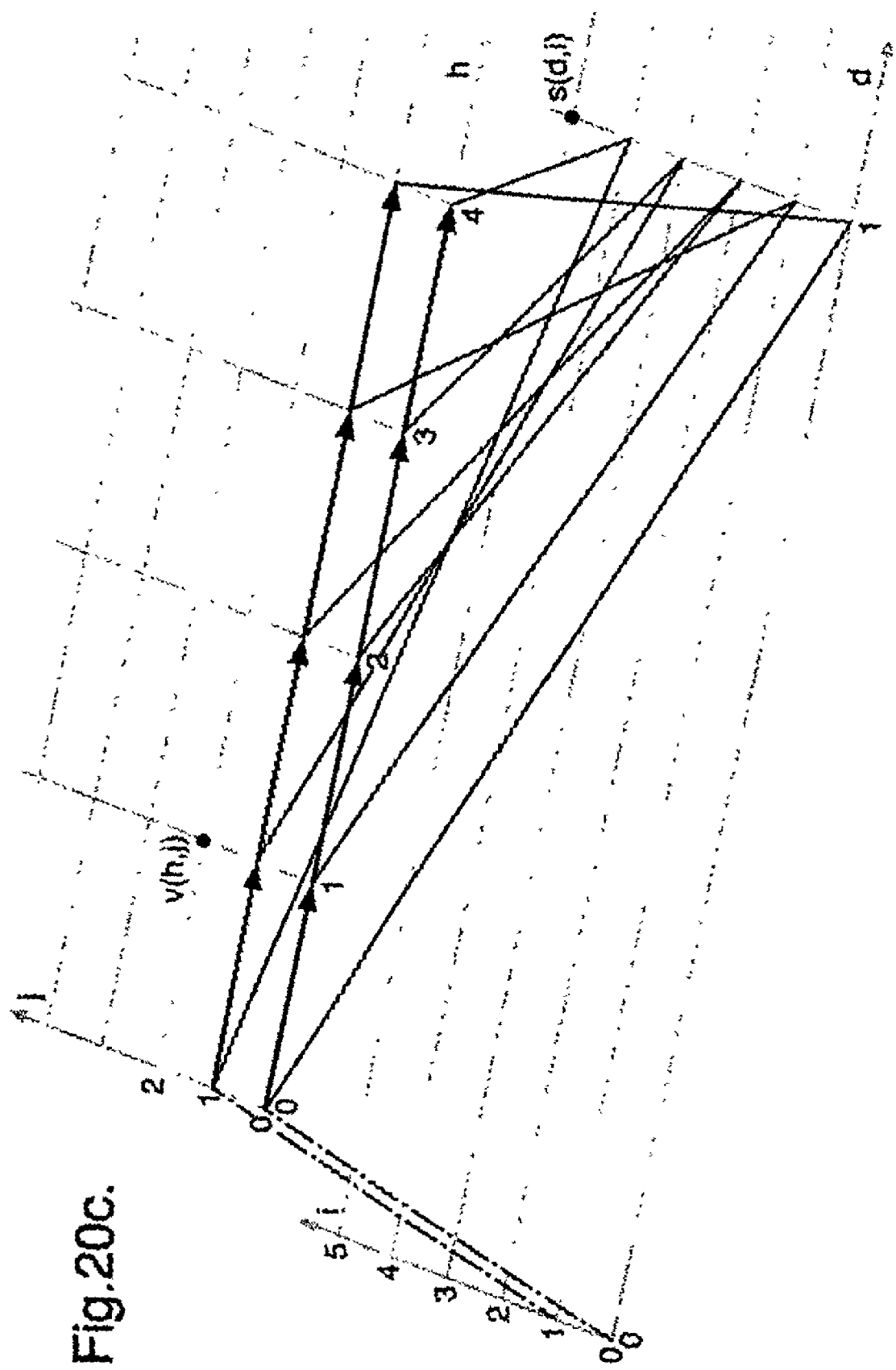
Figure 20D:
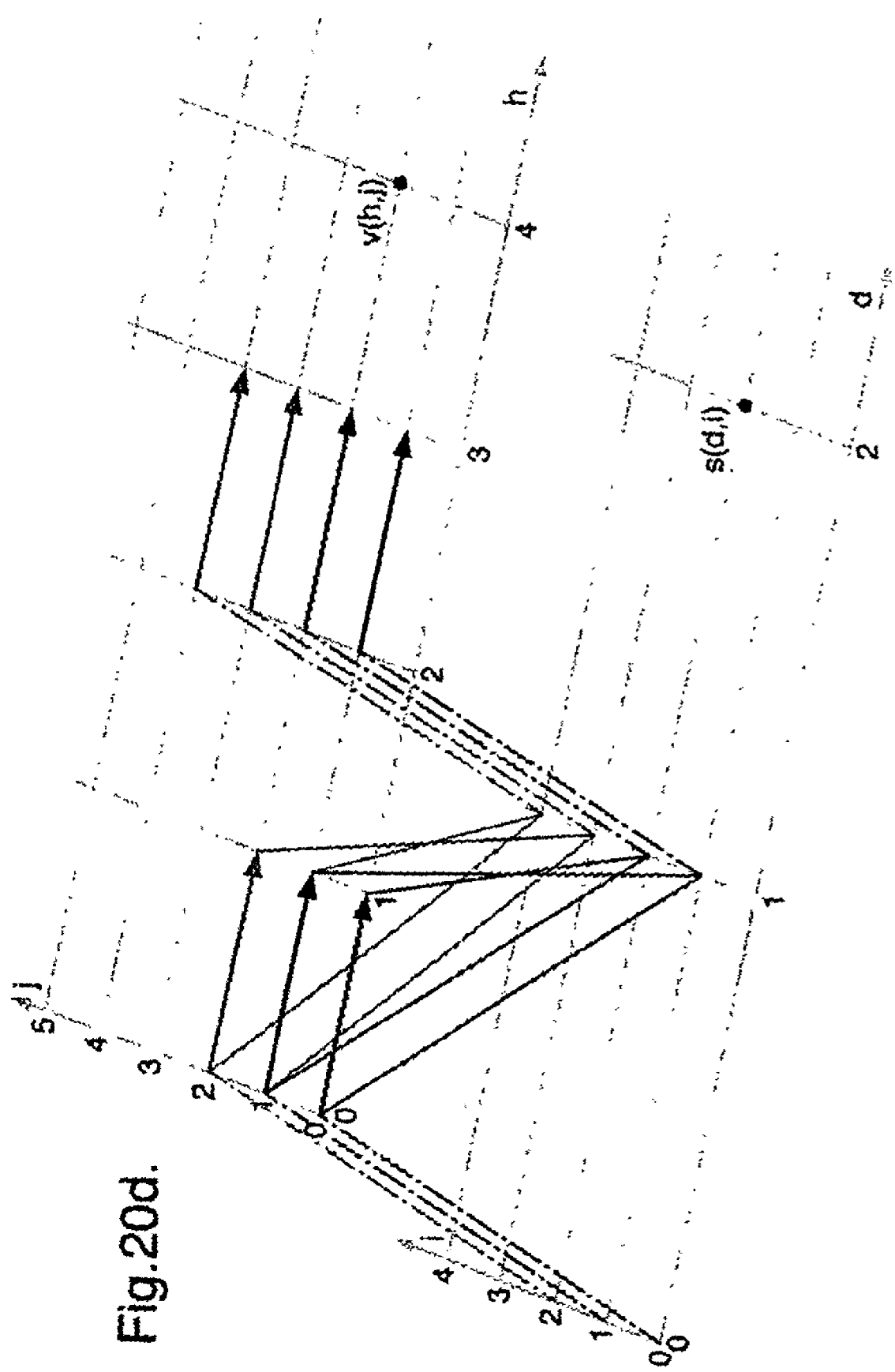
Figure 20E:
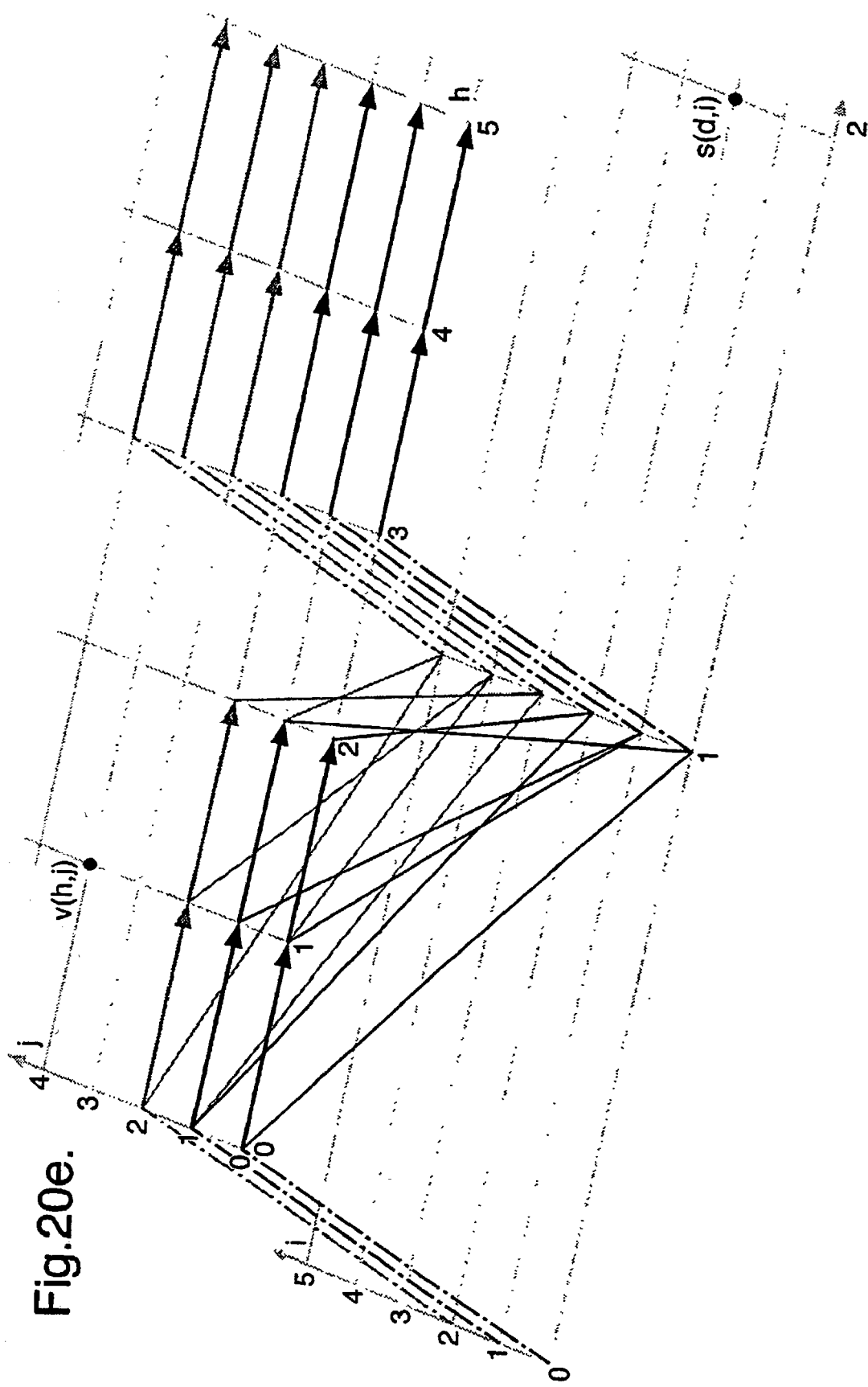

We noted earlier that a BHC was only intrinsically secure when H<4. The BHC fragments used in this chain-tree hybrid have H=2, which ensures the security of the hybrid scheme. This also suggests that a binary chain-tree hybrid could be constructed from chain fragments of length three (H=3) without compromising security. In this case, each parent seed would produce six children when paired with its sibling and half-sibling, giving a threefold growth in tree width at each level (a ternary tree—BHC3-T). This construction is shown in FIG. 20e but a full analysis is left for future work. It has the potential to be more efficient than BHC-T, if a little more complex.

Binary Hash Tree II (BHT2)

We now present a further binary tree based construction that combines the BHT and the BHC-T approaches in a way that greatly tightens security against brute force attack. We use the same notation for the seeds, $s_{d,i}$, but with the origin for d being at the root as for BHT, its value rising as it approaches the leaves. One element of the tree is shown in FIG. 16. We use two blinding functions in this construction, $b_0(\ )$ and $b_1(\ )$, which we will term 'left' and 'right' respectively, as was the case with the BHT.

1. Let us assume we have two randomly generated initial seed values, $s(0,0)$ and $s(0,1)$. Again, as a concrete example, we will take their values as 128 bits wide.

2. The sender decides on the required maximum tree depth, D.

We produce two blinded values from each of these initial seeds, one with each of the blinding functions.

$v(1,0)=b_0(s(0,0)); v(1,1)=b_1(s(0,0));$ $v(1,2)=b_0(s(0,1)); v(1,3)=b_1(s(0,1)).$

3. To produce child seed, $s(1,1)$, we combine the two left blinded seeds, $v(1,0)$ and $v(1,2)$.

To produce child seed, $s(1,2)$, we combine the two right blinded seeds, $v(1,1)$ and, $v(1,3)$.

4. If we now randomly generate a third initial seed, $s(0,2)$, we can combine the second and third initial seeds in the same way to produce two more child seeds, $s(1,3)$ and $S(1,4)$. As with the BHC-T hybrid, this means that every parent seed produces two children enabling us to build a binary tree, but with the edges 'withering' inwards. In fact, if layer d contains $n_d$ seeds, $n_{(d+1)}=2n_d-2$. As long as more than two initial seeds are used, the tree will tend towards a binary tree.

Formally:

$s(d,i)=c(v(2d-1, i/2), v(2d-1, i/2+1))$ for odd $i=c(v(2d-1, i/2), v(2d-1, i/2-1))$ for even $i$ (4.4.1)

where $$v(h,j)=b(s((h-1)/2, j)).$$

5. The key sequence is then constructed from the seed values across the leaves of the tree.

Formally, $k_i=s_{D,i}$ (4.4.2)

6. The sender starts multicasting the stream, encrypting $ADU_0$ with $k_0$, $ADU_1$ with $k_1$ etc. but leaving at least the ADU sequence number in the clear.

FIG. 16a) illustrates two parent seed-pairs of the BHT2, <s(0,0), s(0,1) and <s(0,1), s(0,2). The rings identify the parent seed that is common to each pair in both parts a) and b) of the figure, in exactly the same fashion as was used to illustrate the BHC-T hybrid. As before, FIG. 16b) shows how a tree of seeds built with BHT2 can be represented, hiding the intermediate blinded values from view for clarity. Once these internal values are hidden, the resulting BHT2 looks identical to the BHC-T hybrid in FIG. 4.3.2.

The algorithm to calculate which seeds to reveal in order to reveal a range of keys is also identical to that for the BHC-T hybrid in Appendix B; thus the ringed seeds in FIG. 12 would still reveal $k_3$ to $k_9$ to a particular receiver.

The maximum number of keys across the leaves of a BHT2 built from three initial seeds (at layer 0) to depth D is $2^D+2$. If a continuous tree is required, the keys can be defined to step down the layers of intermediate seeds rather than stay level across them, similar to the continuous BHT shown in FIG. 10. We have shown how to build a binary tree only using two of the combinations of the four blinded values in (4.4.1).

Taking the four values two at a time, gives six possible combinations:

| | | | | |
|---|---|---|---|---|
| c1 | = | c(v(1,0), | v(1,1) | ) |
| c2 | = | c(v(1,2), | v(1,3) | ) |
| c3 | = | c(v(1,0), | v(1,2) | ) |
| c4 | = | c(v(1,1), | v(1,3) | ) |
| c5 | = | c(v(1,0), | v(1,3) | ) |
| c6 = c(v(1,1), v(1,2)) | | | | | c1 and c2 are dependent on only one parent seed each. Therefore, revealing the parent alone reveals a child, ruling out the use of either. Further, c6=c(c3, c4, c5) and c5=c(c3, c4, c6) etc. Therefore revealing any three of these combinations implicitly reveals the fourth. Nonetheless, any three of these combinations can be used rather than just the two used in the BHT2. Analysis of the resulting ternary tree (BHT3) is left for future work.

Common Model

Having presented four key sequence constructions, we now present a common model, which allows all of these schemes and others like them to be described in the same terms.

We define two co-ordinate planes
- a 'blinding' plane with discrete values, v, sitting at co-ordinates (h,j) such that, in general, values at one h co-ordinate are blinded to produce the values at h+1, the specific mappings depending on the scheme;
- a 'combining' plane with discrete values, s, sitting at co-ordinates (d,i), which are the result of combining values from the blinding plane in ways that again depend on the scheme Each construction is built from elementary mathematical 'molecules' in the blinding plane. FIGS. 20a–20e show these molecules as a collection of thick black arrows representing the blinding functions mapping from one value of v to the next, starting from the h=0 axis. To show how the construction grows in the direction of the j axis, the thick but very light-grey arrows represent blinding of adjacent values that complete the next molecule. A molecule is defined by three constants:

H, the height of one molecule along the h axis of the blinding plane

P, the number of blinding functions used within one molecule

Q, the number of values that are combined from each molecule in the blinding plane to produce each value in the combining plane The initial values, v, of one molecule in the blinding plane map directly from the previous values, s, in the combining plane (shown as chain dashed lines in FIGS. 20a–20e):

if $h$ mod $H=0$; $v(h,j)=s(h/H,j)$ (4.5.1).

Subsequent values in a blinding plane molecule are blinded from previous values (shown as thick arrows):

if $h$ mod $H$ 0; $v(h,j)=b_p(v((h-1), j/P))$ (4.5.2).

where p=j mod P.

The resulting final values in the blinding plane molecule are then combined to produce the next values in the combining plane (shown as thin lines):

$$s(d,i)=c(v(h_0,j_0), \ldots v(h_q,j_q), \ldots v(h_{(Q-1)},j_{(Q-1)}))$$ (4.5.3).

Where $h_q$ are $J_q$ are defined for each construction as functions of the parameter q.

Thus, d increments one in the combining plane for every H along the h axis in the blinding plane.

Table 1 gives the values of H, P and Q and the formulae for $h_q$ are $j_q$ that define each construction. It also refers to the figures that illustrate each construction using this common model.

TABLE 4.5.1

Coefficients of the common model defining each key sequence construction

| | BHT2 | BHT | BHC | BHC-T | BHC3-T |
|---|---|---|---|---|---|
| Fig | 20a | 20b | 20c | 20d | 20e |
| H | 2 | 2 | H | 2 | 3 |
| P | 2 | 2 | 1 | 1 | 1 |
| Q | 2 | 1 | 2 | 2 | 2 |
| $h_q$ | Hd − 1 | | H(d − 1) + q(H − 1) + (1 − 2q)(i mod H) | | |
| $J_q$ | i − 1 + 2q | i | i/H + q | | |

In all cases, unless a continuous construction is desired, the keys constructed from the sequence are defined by:

$k_i=s(D,i)$ (4.5.4)

where $D=\log(N_0)$ where $N_0$ is the maximum number of keys required

Incidentally, the one-way function tree (OFT) [McGrew98] results from setting { . . . ?}

Trading Off Storage Against Processing

In all the MARKS constructions, a small number of seeds is used to generate a larger number of keys, both at the sender before encryption and at the receiver before decryption. In either case, there may be limited storage capacity for the key sequence, which requires exponentially more storage than the seeds. In such cases, the first few keys may be calculated while storing the seeds that will allow the remainder to be calculated. In general, either storage can be saved or repetition of the same calculations can be avoided, depending whether storage or processing time is in shortest supply.

With the BHC, the whole reverse chain has to be traversed before the first key can be calculated. However, not every value needs to be stored. The values at the half-way point, three-quarter point etc. may be stored and the rest discarded. As the sequence eats back into this reverse chain, the next value can always be recalculated by re-running the hash chain from the previous stored value, storing more values on the way as required.

With all the tree constructions, any intermediate seeds down the branch of the tree to the first key need to be calculated before the session can start, but again they don't all need to be stored. Those closest to the leaves should be stored (cached), as they will be needed soonest to calculate the next few keys. As intermediate seeds nearer to the root are required, they can be recalculated as long as the seeds originally sent by the key manager are never discarded.

Efficiency

As has already been noted, the BHC with H3 is extremely efficient but insecure. Therefore we will confine discussion to the binary tree-based constructions that we have fully analysed. Table 5.2.1 shows various parameters of BHT, BHC-T and BHT2 per secure multicast session, where:

R, S and KM are the receiver, sender and key manager, respectively, as defined in Section 3 N (=n−m+1) is the length of the range of keys that the receiver requires, randomly positioned in the key space $w_s$ is the size of a seed (typically 128b) $w_h$ is the size of the protocol header overhead $t_s$ is the processor time to blind a seed (plus one relatively negligible circular shifting and/or combining operation)

tial access of keys. In this case, the most efficient values to store during any session (other than the minimum set revealed to allow construction of the tree) are the ones on the branch from the root to the key in current use. The mean processing per key is then the number of hash operations in the whole tree divided by the number of keys at the leaves. Only the sender (or a group controller if there are multiple senders) is required to generate random bits for the initial seeds. The number of bits required is clearly equal to the minimum sender storage of these initial seeds.

It can be seen that the only parameters that depend on the size of the group membership are those that are per receiver. The cost of two of these (storage and processing latency) is distributed across the group membership thus being constant per receiver. Only the unicast message size causes a cost at a key manager that rises linearly with group membership size, but the cost is only borne once per receiver session. Certainly, none of the per receiver costs are themselves dependent on the group size as in all schemes that allow unplanned eviction. Thus, all the constructions presented are highly scalable.

Comparing the schemes with each other, perhaps surprisingly, the hybrid BHC-T and BHT2 are very nearly as efficient as the BHT in messaging terms. They both only require an average of one more seed per receiver session set-up message. If N is large, this is insignificant compared to the number of keys required per receiver session. On average BHC-T requires twice as much processing and BHT2 four times as much as BHT. However, we shall see that the security improvements are well worth the cost.

BHT

With the BHT, each seed in the tree is potentially twice as valuable as its child. Therefore, there is an incentive to exhaustively search the seed space for the correct value that blinds to the current highest known seed value in the tree. For the MD5 hash, this will involve $2^{127}$ MD5 operations on

TABLE 1

Various parameters of BHT, BHC-T and BHT2 per secure multicast session[i]

|  |  |  | BHT | BHC-T | BHT2 |
|---|---|---|---|---|---|
| per R | (unicast message size)/$w_s$ − $w_h$ | min | 1 | 3 | 3 |
|  | or | max | 2(log(N + 2) − 1) | 2logN | 2logN |
|  | (min storage)/$w_s$ | mean | O(log(N) − 1) | O(log(N)) | O(log(N)) |
| per R | (processing latency)/$t_s$ | min | 0 | 0 | 0 |
|  |  | max | log(N) | 2(log(N) − 1) | 4(log(N) − 1) |
|  |  | mean | O(log(N)/2) | O(log(N) − 1) | O(2(log(N) − 1)) |
| per R or S | (processing per key)/$t_s$ | min | 1 | 2 | 4 |
|  |  | max | log(N) | 2(log(N) − 1) | 4(log(N) − 1) |
|  |  | mean | 2 | 4 | 8 |
| per S or KM | (min storage)/$w_s$ |  | 1 | 3 | 3 |
| per S | (min random bits)/$w_s$ |  |  |  |  |

The unicast message size for each receivers session set-up is shown equated to the minimum amount of storage each receiver requires. This is only so if the receiver chooses to trade off storage for processing as described in above. The same trade-off has been used for the minimum sender storage row. The processing latency is the time required for one receiver to be ready to decrypt incoming data after having received the unicast set-up message for its session. Note that there is no latency cost when other members join or leave, as in schemes that cater for unplanned eviction. Note that the figures for processing per key assume sequenaverage. It is possible a value will be found that is incorrect but blinds to a value that collides with the known value (typically one will be found every $2^{64}$ operations with MD5). This will only be apparent by using the seed to produce a range of keys and testing one on some data supposedly encrypted with it. Having succeeded at breaking one level, the next level will be twice as valuable again, but will require the same brute-force effort to crack. Note that one MD5 hash (portable source) of a 128b input takes about 4 us on a Sun SPARCserver-1000. Thus, $2^{128}$ MD5s would take 4e25 years.

BHC-T

With the BHC-T hybrid, the strength against attack depends on which direction the attack takes. If we take a single element of the BHC-T, it has four seed values—two parents and two children as shown in Table 5.3.1 and also illustrated in FIG. 17. Given only any one of the four values, none of the others can ever be calculated as there is insufficient information to test correctness. Given three of the four values, the fourth can always be calculated with just one blinding operation. Given just two of the values, the table lists how difficult it is to calculate the other two, depending on which two are given. The letter 'i' represents an input value and the values in the cells represent the number of blinding function operations necessary to guarantee finding the pair of output values given the inputs. w is the number of bits in the number-space (128 for MD5). FIG. 17 shows the same information graphically, with input values ringed and blinded values shown over a grey background.

| parents | s(0,0) | i | $1 + 2^{(w+1)}$ | i | | $1 + 2^w$ | i | 2 |
|---|---|---|---|---|---|---|---|---|
| | s(0,1) | i | | | $1 + 2^w$ | i | | 2 | i |
| children | s(1,1) | 2 | i | | i | $1 + 2^w$ | | i |
| | s(1,2) | | i | | $1 + 2^w$ | i | | i | 2 |

FIG. 17—Revealing and blinding seed pairs in BHC-T

If a parent and child down one side of the 'square' are given, the opposite parent can be searched exhaustively, with each value tested by blinding it and comparing it with the XOR of the two given values. Thus, success is guaranteed after $2^w$ blinding operations for a 'sideways' attack.

If only the two child values are given, the exhaustive search for one of the parents is slightly more involved. That is, one parent value, s(0,1) is guessed, and it is only correct if the following is true:

$$c(s(0,1), b(c(s(1,1), b(s(0,1)))))=s(1,2)$$

Thus, success is guaranteed after $2^{(w+1)}$ blinding operations for an 'upwards' attack.

The probability of finding two unknown values that are compatible with the two given values but are also not the correct pair of values (a double collision) is small in this construction. If such a pair does turn up, they can only be tested by producing keys with them and testing the keys on encrypted data. The lesser probability of a double collision therefore slightly reduces the complexity of the attacker's task.

A sideways attack can only gain at most one seed at the same level as the highest seed already known. An attack to the right ends at an even indexed child as only one value is known in the next 'box' to the right. Similarly, attacking to the left is blocked by an odd indexed child. An upward attack is then the only remaining option. One successful upward attack gives no extra keys, but when followed by a sideways attack reveals double the keys of the last sideways attack.

BHT2

The strength of the BHT2 against attack takes a similar form to that of the BHC-T hybrid, except the strength against upward attack is designed to be far greater. As with BHC-T, just one known value from a 'square' of four can never reveal any of the others. However, unlike BHC-T, three values do not necessarily immediately give the fourth. If only one parent is unknown, $2^w$ blinding operations are required to guarantee finding it. Given just two of the values, Table 5.3.2 lists how difficult it is to calculate the other two, depending on which two are given. As before, the values in the cells represent the number of blinding function operations necessary to guarantee finding the pair of output values given the inputs. FIG. 18 shows the same information graphically, with input values ringed and blinded values shown over a grey background.

TABLE 2

Revealing and blinding seed pairs in BHT2

| parents | s(0,0) | i | $2^{2w}$ | i | | $3 + 2^w$ | i | | $3 + 2^w$ |
|---|---|---|---|---|---|---|---|---|---|
| | s(0,1) | i | | $3 + 2^w$ | i | | $3 + 2^w$ | | 1 |
| Children | s(1,1) | 4 | i | i | | $3 + 2^w$ | | | 1 |
| | s(1,2) | i | | $3 + 2^w$ | i | | i | | $3 + 2^w$ |

FIG. 18—Revealing and blinding seed sub-sets in BHT2

If a parent and either child down one side of the 'square' are given, the opposite parent can be searched exhaustively, with each value tested by blinding it and comparing it with the XOR of the two known values. Thus, success is guaranteed after $2^w$ blinding operations for a 'sideways' attack. The same applies if a parent and the opposite child are given.

If only the two child values are given, the exhaustive search for the parents is designed to be much more involved in BHT2. For each guess at the right parent value, s(0,1), it must be left blinded then the left parent value has to be exhaustively searched to find a left blinded value which, when combined with the first left blinded guess gives the given value of the left child. However, when these two parent guesses are right blinded, they are unlikely to combine to give the correct right child. Thus, the next guess at the right parent has to be combined with an exhaustive search of the blinded values of the left parent and so on. This is equivalent to solving the following simultaneous equations, given only s(1,1) and s(1,2):

$$c(b_0(s(0,0)), b_0(s(0,1)))=s(1,1)$$

$$c(b_1(s(0,0)), b_1(s(0,1)))=s(1,2)$$

To guarantee success therefore requires an exhaustive search of the square matrix of combinations of the two parents, that is $2^{2w}$ blinding operations. The greater strength against brute force attack in the child to parent direction is shown in the figure by a darker grey background. An alternative would be to store all the left and right blinded values of one parent to save keep recalculating them. However just the unindexed left blinded values of every possible value of one parent would consume more than 5e27TB of storage, the cost of which makes other means of attack more economically worthwhile!

The same comments about double collisions apply to BHT2 as did to BHC-T, except the wrong pair of values would only appear if four hash collisions were stumbled upon simultaneously—an event with vanishingly small probability.

Sideways attacks in BHT2 are confined to at most one 'box' either way as they are in BHC-T. Therefore, to gain any significant number of keys, an upward attack soon has to be faced. $2^w$ blinding operations for a sideways attack will probably be more expensive than legally acquiring the keys being attacked. Once an upward attack has to be faced, $2^{2w}$ blinding operations are definitely an incentive to find another way.

General Security

Generally, the more random values that are needed to build a tree, the more it can contain sustained attacks to within the bounds of the sub-tree created from each new random seed However, for long-running sessions, there is a trade-off between security and the convenience of a continuous key-space, as discussed above in relation to continuous trees. The randomness of the randomly generated seeds is another potential area of weakness that must be correctly designed.

All the MARKS constructions are vulnerable to collusion between valid group members. If a sub-group of members agree amongst themselves to each buy a different range of the key space, they can all share the seeds they are sent so that they can all access the union of their otherwise separate key spaces. Arbitrage is a variant of member collusion that has already been discussed. This is where one group member buys the whole key sequence then sells portions of it more cheaply than the selling price, still making a profit if most keys are bought by more than one customer. Protection against collusion with non-group members is discussed in Section 6.3 on watermarking.

Finally, the total system security for any particular application clearly depends on the strength of the security used when setting up the session. The example scenario in above describes the issues that need to be addressed and suggests standard cryptographic techniques to meet them. As always, the overall security of an application using any of the MARKS constructions is as strong as the weakest part.

The key management schemes described in the current work lend themselves to modular combination with other mechanisms to meet the additional commercial requirements described below.

Multi-sender Multicast

A multi-sender multicast session can be secured using the MARKS constructions as long as all the senders arrange to use the same key sequences. They need not all simultaneously be using the same key as long as the keys they use are all part of the same sequence. Receivers can know which key to use even if each sender is out of sequence with the others as long as the ADU index is transmitted in the clear as a header for the encrypted ADU. The example scenario in Section 3 described how multiple senders might synchronise the ADU index they were all using if this was important to the commercial model of the application.

If each sender in a multi-sender multicast uses different keys or key sequences, each sender is creating a different secure multicast session even if they all use the same multicast address. This follows from the distinction between a multicast session and a secure multicast session defined in Section 2.1. In such cases each secure multicast session must be created and maintained separately from the others. However, there may be some scope for what is termed amortised initialisation [Balen99]. That is, distinct secure multicast sessions can all use the same set-up data to save messaging. For instance, the commercial model might be that customers always have to buy the same ADUs from every one of a set of related senders if they buy any at all from each. In such a scenario, each sender might combine a MARKS sequence of keys common to all senders with a long-term key specific to that sender. The customer could buy the relevant seeds for the common range of keys, then buy an additional long-term key for each sender she wished to decrypt.

Non-sequential and Multi-sequential Key Access

The MARKS constructions are designed to be efficient when giving each receiver access to a key sequence that is an arbitrary sub-range of a wider sequence, but not where the data isn't sequential or where arbitrary disjoint parts of a sequence are required. Thus MARKS is targeted at data streams that are naturally sequential in one dimension, such as real-time multimedia streams.

However, once a receiver has access to a range of keys, clearly there is no compulsion to access them in sequential order. For instance, the receiver may store away a sub-range of a stream of music being multicast over the Internet encrypted using one of the MARKS key sequences. Using an index of the tracks downloaded, the receiver could later pick out tracks to listen to in random order, using the relevant keys taken out of order from the MARKS sequence.

Figure 19:
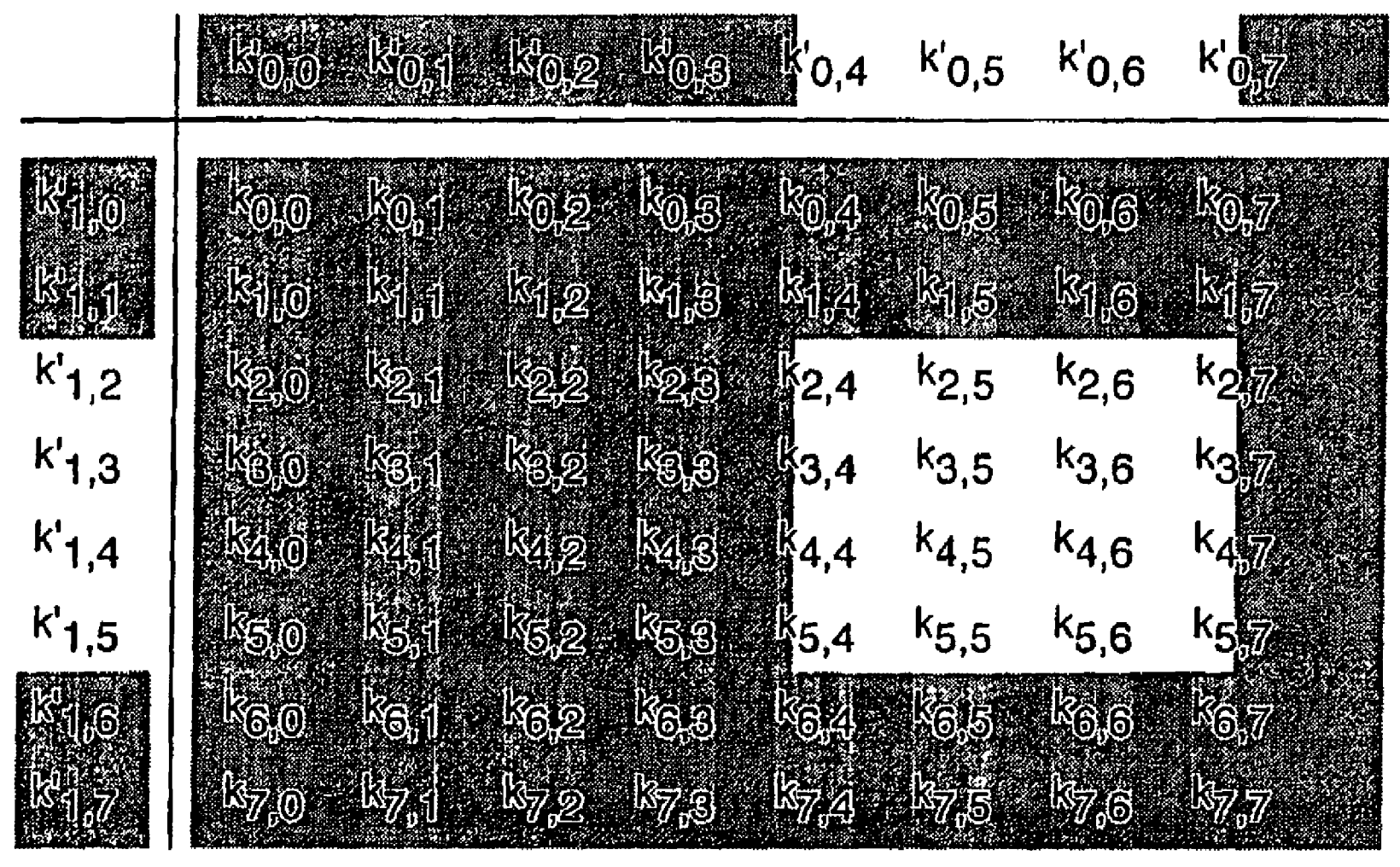

MARKS can also be used to restrict access to data that is sequential but in multiple dimensions. Some examples of such applications are described in M. Fuchs, C. Diot, T. Turletti, M. Hoffman, "A Naming Approach for ALF Design", in proceedings of HIPPARCH workshop, London, (June 1998). A two dimensional key sequence space is shown in FIG. 19.

For instance, access to multicast stock quotes could be sold both by the duration of the subscription and by the range of futures markets subscribed to. Each quote would then need to be encrypted with two intermediate keys XORed together. Thus the 'final keys' actually used for encryption would be:

$$k_{i,j} = c(k'_{0,i}, k'_{1,j}).$$

One intermediate key would be from a sequence $k'_{0,i}$ where i increments every minute. The other intermediate key could be from a sequence $k'_{1,j}$ where j represents the number of months into the future of the quote. A trader specialising in one to two year futures would not only buy the relevant subrange of $k'_{0,i}$ depending on how long she wanted to subscribe, but she would also buy the range of intermediate keys $k'_{1,12}$ to $k'_{1,24}$.

An approach such as Ross Anderson & Charalampos Manifavas (Cambridge Uni), "Chameleon—A New Kind of Stream Cipher" Encryption in Haifa (January 1997), (described earlier) can be used to watermark the keys used to decrypt the stream of data. Thus, the keys generated by any of the MARKS constructions are treated as intermediate keys. The sender creates a sequence of final keys by combining each intermediate key with a long-term key block (512 kB in the concrete example) as described in Section 2.2. Each receiver is given a long-term watermarked version of the same block to produce a watermarked sequence of final keys from her sequence of intermediate keys, thus enforcing watermarked decryption.

However, this approach suffers from a general flaw with Chameleon. It creates an audit trail for any keys or data that are passed by a traitorous authorised receiver to a completely unauthorised receiver—that is a receiver without a long-term key block. In such cases the traitor who revealed the keys or data can be traced if the keys or data are traced. However, intermediate keys, rather than final ones, can be passed to any receiver who has, at some time, been given a long-term key block that is still valid. Thus a receiver not entitled to certain of the intermediate keys (which are not watermarked) can create final keys watermarked with her own key block and hence decrypt the cipherstream. Although the keys and data produced are stamped with her own watermark, this only gives an audit trail to the target of the leak, not the source. Hence, there is little deterrent against this type of 'internal' traitor.

Returning to the specific case of the MARKS constructions, this general flaw with Chameleon means that either the intermediate seeds or the intermediate keys can be passed around internally without fear of an audit trail. For instance, in the above network game example, a group of players can collude to each buy a different game-hour and share the intermediate seeds they each buy between themselves. To produce the real keys, each player can then use her own watermarked long-term key block that she would need to play the game. No audit trail is created to trace who has passed on unwatermarked intermediate seeds. However, there is an audit trail if any of the players tries to pass the watermarked keys or data to someone who has not played the game recently and therefore doesn't have a valid long term key block of their own. Similarly, there is an audit trail if, instead, one of the players passes on their long-term key block, as it also contains a watermark traceable to the traitorous receiver.

Unplanned Eviction

As already pointed out, the MARKS constructions allow for eviction from the group at arbitrary times, but only if planned at the time each receiver session is set up. If pre-planned eviction is the common case, but occasionally unplanned evictions are needed, any of the MARKS schemes can be combined with another scheme, such as LKH++ [Chang99] to allow the occasional unplanned eviction. To achieve this, as with watermarking above, the key sequences generated by any of the MARKS constructions are treated as intermediate keys. These are combined (e.g. XORed) with a group key distributed using for example LKH++ to produce a final key used for decrypting the data stream. Thus both the MARKS intermediate key and the LKH++ intermediate key are needed to produce the final key at any one time.

Indeed, any number of intermediate keys can be combined (e.g. using XOR) to meet multiple requirements simultaneously. For instance, MARKS, LKH++ and Chameleon intermediate keys can be combined to simultaneously achieve low cost planned eviction, occasional unplanned eviction and a watermarked audit trail against leakage outside the long-term group.

Formally, the final key, $k_{i,j}, \ldots = c(k'_{0,i}, k'_{1,j}, \ldots)$ where intermediate keys k' can be generated from sequences using MARKS constructions or any other means such as those described in the previous two sections on watermarking and multi-dimensional key sequences.

In general, combination in this way produces an aggregate scheme with storage costs that are the sum of the individual component schemes. However, combining LKH++ with MARKS where most evictions are planned cuts out all the re-keying messages of LKH++ unless an unplanned eviction is actually required.

The invention is by no means limited to use with multicast data networks. Two other fields of use are described below by way of example.

Virtual Private Network (VPN)

A large company may allow its employees and contractors to communicate with other parts of the company from anywhere on the Internet by setting up a VPN. One way to achieve this is to give every worker a group key used by the whole company. Consequently, every time a worker joins or leaves the company, the group key has to be changed. Instead the key should be changed regularly in a sequence determined by one of the MARKS constructions, whether or not workers join or leave. As each new employment contract is set up, seeds are given to each worker that allows her to calculate the next keys in the sequence until her contract comes up for renewal. Any worker that leaves prematurely is treated as an unplanned eviction.

Digital Versatile Disk (DVD)

DVD originally stood for digital video disk, because its capacity was suited to this medium. However, it may be used to store content such as software or audio that requires less storage space. Instead of pressing a different sparsely filled DVD for each selection of audio tracks or software titles, using the present invention, each DVD is produced filled to capacity with many hundreds of related tracks or titles. Each track or title constitutes an ADU. Each ADU could be encrypted with a different key from a sequence created using one of the MARKS constructions. These DVDs could be mass-produced and given away free (e.g. as cover disks on magazines). Anyone holding one of these DVDs could then buy seeds over the Internet that would give access to a range of keys to unlock some of the ADUs on the DVD. MARKS is ideally suited to such scenarios because the encryption key cannot be changed once the DVD is pressed, so commercial models that use physical media don't tend to rely on unplanned eviction. This scheme could usefully be combined with Chameleon to watermark the keys and data We have described above solutions to manage the keys of very large groups. It preserves the scalability of receiver initiated Internet multicast by completely decoupling senders from all receiver join and leave activity. Senders are also completely decoupled from the key managers that absorb this receiver activity. We have shown that many commercial applications have models that only need stateless key managers, in which cases unlimited key manager replication is feasible. When one of a replicated set of stateless key managers fails it has no effect on transactions in progress on sister servers, thus isolating the overall system from problems, improving resilience. We have presented a worked example of a large-scale network game charged per minute to illustrate these points.

These gains have been achieved by the use of systematic group key changes rather than receiver join or leave activity driving re-keying. Decoupling is achieved by senders and key managers pre-arranging the unit of financial value in the multicast data stream (the 'application data unit' with respect to charging). A systematic key change can then be signalled by incrementing the ADU index declared in the data. Using this model, there is zero side-effect on other receivers as well as on the senders when one receiver joins or leaves. We also ensure multicast is not used for key management, only for data transfer. Thus, re-keying isn't vulnerable to random transmission losses, which are complex to repair scalably when using multicast. Traditional key management solutions have successfully improved the scalability of techniques to allow unplanned evictions of group members, however the best techniques are still costly in messaging terms. In contrast we have focussed on the problem of planned eviction. That is, eviction after some arbitrary future ADU, but planned at the time a receiver requests a session. We have asserted that many commercial scenarios based on pre-payment or subscription don't require unplanned eviction but do require arbitrary planned eviction. Examples are pay-TV, pay-per-view TV or network gaming.

To achieve planned but arbitrary eviction we have designed a choice of key sequence constructions that are used by the senders to systematically change the group key. They are designed such that any sub-range of the sequence can be reconstructed by revealing a small number of seeds (16B each). Thus receivers can be given access to arbitrary sub-ranges of the data sequence. All the practical schemes can reveal N keys to each receiver using O(log(N)) seeds. The schemes differ in the processing load to calculate each key, which is traded off against security. The heaviest scheme requires on average just O(2(log (N)−1)) fast hash operations to get started, then on average just sixteen more hashes to calculate each new key in the sequence, which can be done in advance. The lightest scheme requires four times less processing than this.

To put this work in context, for pay TV charged per second with 10% of ten million viewers tuning in or out within a fifteen minute period, the best alternative scheme (Chang et al) might generate a re-key message of the order of ten of RB thousands of bytes every second multicast to every group member. The present work requires a message of a few hundred bytes unicast just once to each receiver at the start of perhaps four hours of viewing.

Appendix A—Algorithm for identifying minimum set of intermediate seeds for BHT

In the following C-like code fragment

```
the function odd (x) tests whether x is odd
and the function reveal (d,i) reveals seed s_{d,i} to the receiver
min=m; max=n;
if (min max) error( );            // reject min max
for(d=D; d=0; d--) {              // working from bottom of tree...
                                  // move up the tree one level each loop
    if (min == max) {             // min & max have converged...
        reveal (d,min);           // ...so reveal root of sub-tree...
        break;                    // ...and quit
    }
    if odd(min) {                 // odd min values are never left
children...
        reveal (d,min);           // ...so reveal odd min seed
        min++;                    // and step min inwards one seed to right
    }
    if !odd(max) {                // even max values are never right
children...
        reveal (d,max);           // ...so reveal even max seed
        max--;                    // and step max inwards one seed to left
    }
    if (min max) break;           // min & max were cousins, so quit
    min/=2;                       // halve min ...
    max/=2;                       // ... and halve max ready for...
}                                 // ... next level up round loop
```

Appendix B—Algorithm for identifying minimum set of intermediate seeds for BHC-T In the following C-like code fragment

```
the function odd (x) tests whether x is odd
and the function reveal (d,i) reveals seed s_{d,i} to the receiver
min=m; max=n;
if (min max) error( );   // reject min max
d=0;                     // working from bottom of tree
    if (max <= min+1) {  // requested min & max are adjacent/the
same...
        reveal (d,min);  // ...so reveal left...
        if (max < min)   // requested min & max are not the same...
            reveal (d,max); // ...so reveal right too...
        break;           // ...and quit
    }
for (d=0; ; d++) {       // move up the tree one level each loop
    if (max <= min+3) {  // min & max are two or three apart...
        if (max < min+3) { // min & max were two apart...
            reveal (d,min);  // ...so reveal left...
            reveal (d,max);  // ...and right
            reveal (d,min+1);// ...and centre...
            break;           // ...and quit
        } else {             // min & max were three apart,
so...
            if (!odd(min)) { // ...only if min is even...
                reveal (d,min+1); // ...reveal left centre...
                reveal (d,max-1); // ...and right centre...
                break;            // ...and quit
            }
        }
    }
    if !odd (min) {      // even min values are never right
children...
        reveal (d,min);  // ...so reveal even min seed
        min++;           // and step min inwards one seed to right
    }
    if odd (max) {       // odd max values are never left
children
        reveal (d,max);  // ...so reveal odd max seed
        max--;           // and step max inwards one seed to left
    }
    min/=2;              // halve min ...
    max/=2;              // ... and halve max ready for...
}                        // ... next level up round loop
```

The invention claimed is:

1. A method of distributing data comprising:
(a) encrypting a plurality of data units each with a different one of a first sequence of keys;
(b) communicating encrypted data units to a plurality of user terminals;
(c) communicating at least one seed value to a user terminal;
(d) generating from the seed value or values a second sequence of keys greater in number than the number of seed values communicated to the user terminal; and
(e) decrypting data units at the user terminal using said second sequence of keys, characterised in that in step (d) a sequence of keys constituting an arbitrarily doubly bounded portion of the sequence of keys of step (a) is generated, and in that the position in sequence of the lower and upper bounds of the said portion are determined by the at least one seed value communicated in step (c).

2. A method according to claim 1, in which the sequence of keys used in step (a) is generated by:
(a) operating on one or more initial seed values and generating a greater number of intermediate seed values, which intermediate seed values blind the initial seed values:
(b) further operating on the values produced by the preceding step and generating thereby a still greater number of further values, which further values blind the values produced by the preceding step;
(c) iterating step (b) until the number of values produced is equal to or greater than the number of keys required for step (a).

3. A method according to claim 1, in which step (d) includes combining values derived from a plurality of different seed values.

4. A method according to claim 3, in which step (d) includes
(I) combining first and second values derived from respective first and second blinding function chains, thereby producing a first next seed or key, the first and second blinding function chains having different respective seeds
(II) combining a value derived from a position in the first chain subsequent to the position of the first value and a value derived from a position in the second chain preceding the position of the second value, thereby producing a further next seed or key value.

5. A method according to claim 4, including iterating step (II) thereby producing further key values, in each iteration values from positions subsequent to the previous position in the first chain and preceding the previous position in the second chain being combined.

6. A method according to claim 1, in which step (d) includes operating on a plurality of seed values with each of a plurality of different blinding functions.

7. A method according to claim 6, including:
(I) operating on at least one root seed value with each of a set of different blinding functions thereby producing a plurality of further values;
(II) operating with each of the set of different blinding functions on the further values produced by the preceding step or on values derived therefrom;
(III) iterating step (II) and thereby producing, by the or each iteration, a next successive layer in a tree of values;
(IV) in step (a), using as the sequence of keys values derived from the sequence of seeds in one or more of the layers produced by step (III); and
(V) in step (c), communicating to a user terminal at least one value from within the body of the tree, the position in the tree of the or each value communicated to the user terminal thereby determining the position and extent of the portion of the sequence of keys available to the user for use in decrypting data units.

8. A method according to claim 7 including, in step (I)
(i) operating with the set of different blinding functions on plurality of different seed values
(ii) for each of the different blinding functions, combining the result of operating with one blinding function on one of the seed values and the result of operating with the same or another blinding function on another of the respective seed values, thereby producing a plurality of further values.

9. A method according to claim 1 in which the seed values are communicated to the user terminals, via a communications network.

10. A method according to claim 9 in which the seed values are communicated from a plurality of key management nodes to customer terminals.

11. A method according to claim 1, in which each encrypted data unit carries an unencrypted index number to identify to any receiver which key in the sequence should be used to decrypt that data unit.

12. A method according to claim 1 where the seeds required by any receiver to construct the keys for a specific sub-range of the entire key sequence are communicated in an order that implicitly identifies each seed.

13. A method according to claim 1, in which multiple data senders use the same sequence of keys as each other to encrypt the same or different data units.

14. A method according to claim 1, in which each key in the sequence generated from the seeds is used as an intermediate key to be combined with another intermediate key or sequence of keys to produce a sequence of keys to encrypt or decrypt the data units.

15. A communications network comprising means arranged to operate in accordance with the method of claim 1.

16. A network according to claim 15, in which the data is distributed using a multicast or broadcast transmission mode.

17. A network according to claim 15, in which the network includes a virtual private network (VPN) and in which different combinations of seeds for constructing different sub-ranges of keys for decrypting data give members of the virtual private network different periods of access to the VPN.

18. A data carrier storing a plurality of data units encrypted for use in a method according to claim 1.

19. A method according to claim 1, wherein said second sequence of keys is derived from said first sequence of keys.

20. A method according to claim 1, wherein said second sequence of keys is the same as said first sequence of keys.

21. A method of encrypting data for distribution comprising:
(a) operating on at least one root seed value with one or more blinding functions, thereby producing a plurality of further values;
(b) operating with one or more blinding functions on the further values produced by the preceding step or on values derived therefrom;
(c) iterating step (b) and thereby producing, by the or each iteration, a next successive layer in a tree of values;
(d) encrypting a plurality of data units each with a different one of a sequence of key values derived from one or more of the layers generated by step (c).

22. A method of communicating data to a group of users comprising:
(a) encrypting data units for distribution by using for each data unit a different one of a sequence of key values;
(b) systematically and independently of group membership changes changing a key used in encrypting the data units for distribution;
(c) communicating the data units to the users; and (d) at the users' terminals decrypting the data units, characterised by generating from a number of initial seed values a greater number of intermediate seed values, and deriving from the intermediate seed values the sequence of key values used in encrypting the data for distribution.

23. A method according to claim 22, in which every possible sub-set of the sequence of key values is derivable from a respective combination of seed values.

24. A method of distributing data comprising encrypting a plurality of data units each with a different one of a sequence of keys and communicating the encrypted data units to a plurality of user terminals, characterised in that the sequence of keys is generated and allocated to application data units in accordance with a key construction algorithm, and in that copies of the key construction algorithm are distributed to a plurality of key managers so that, in use, receivers may obtain keys for access to an arbitrary portion of the data from a key manager without reference to any data sender or senders.

25. A key manager comprising means arranged to operate in accordance with the method of claim 24.

26. A method of operating a user terminal comprising:
a) receiving a plurality of data units each encrypted with a different one of a sequence of keys;
b) receiving one or more seed values;
c) generating from the one or more seed values an arbitrarily doubly bounded key sequence larger in number than the number of seeds received in step (b); and
d) decrypting the application data units using the values generated in step (c) or values derived therefrom.

27. A customer terminal comprising means arranged to operate in accordance with the method of claim 26.

* * * * *